US011958067B2

(12) United States Patent
Fulkerson et al.

(10) Patent No.: US 11,958,067 B2
(45) Date of Patent: Apr. 16, 2024

(54) POWDER GUN CONFIGURABLE FOR SUPPLY FROM VENTURI OR DENSE PHASE PUMP

(71) Applicant: NORDSON CORPORATION, Westlake, OH (US)

(72) Inventors: Terrence M. Fulkerson, Brunswick Hills, OH (US); Brian D. Mather, North Olmsted, OH (US); Benjamin J. Becker, Rocky River, OH (US)

(73) Assignee: Nordson Corporation, Westlake, OH (US)

( * ) Notice: Subject to any disclaimer, the term of this patent is extended or adjusted under 35 U.S.C. 154(b) by 492 days.

(21) Appl. No.: 16/029,634

(22) Filed: Jul. 8, 2018

(65) Prior Publication Data

US 2018/0311688 A1 Nov. 1, 2018

Related U.S. Application Data

(62) Division of application No. 14/388,450, filed as application No. PCT/US2013/029607 on Mar. 7, 2013, now Pat. No. 10,040,081.

(Continued)

(51) Int. Cl.
*B05B 7/14* (2006.01)
*B05B 5/03* (2006.01)

(52) U.S. Cl.
CPC ............ *B05B 7/1463* (2013.01); *B05B 5/032* (2013.01); *B05B 7/1404* (2013.01)

(58) Field of Classification Search
CPC ...... B05B 7/1463; B05B 5/032; B05B 7/1404
(Continued)

(56) References Cited

U.S. PATENT DOCUMENTS 2,759,764 A 8/1956 Juvinall et al.
4,116,384 A 9/1978 Lacchia
(Continued)

FOREIGN PATENT DOCUMENTS

CN 101559415 A 10/2009
EP 1728558 A2 12/2006
(Continued)

OTHER PUBLICATIONS

Written Opinion dated Sep. 11, 2013, for International Application No. PCT/US2013/029607.
(Continued)

*Primary Examiner* — Steven M Cernoch
(74) *Attorney, Agent, or Firm* — BakerHostetler

(57) ABSTRACT

A powder spray gun includes a powder flow path inlet and a powder flow path outlet, the powder flow path inlet being connectable in a first configuration to a dilute phase powder pump and in a second configuration to a dense phase powder pump, wherein the powder spray gun comprises a spray nozzle that is the same for the first and second configurations. The powder flow path is provided by a powder tube that extends through the gun, with the powder tube having a first diameter at an inlet portion of the spray gun and a second diameter at an outlet portion of the spray gun, with the second diameter being greater than the first diameter. The powder flow path may also include a conical transition portion, and a member for adding air to the powder flow.

14 Claims, 15 Drawing Sheets

Related U.S. Application Data

(60) Provisional application No. 61/623,870, filed on Apr. 13, 2012.

(58) Field of Classification Search
USPC .......................................... 239/704, 706, 690
See application file for complete search history.

(56) References Cited

U.S. PATENT DOCUMENTS

| | | | | |
|---|---|---|---|---|
| 4,715,535 | A | | 12/1987 | Mulder |
| 4,790,376 | A | * | 12/1988 | Weeks .................. E21B 43/124 166/106 |
| 5,344,077 | A | * | 9/1994 | Terry ..................... A62C 31/02 137/238 |
| 5,395,046 | A | | 3/1995 | Knobbe et al. |
| 5,400,976 | A | | 3/1995 | Kaijyu et al. |
| 5,711,489 | A | * | 1/1998 | Yanagida ................ B05B 5/032 239/697 |
| 5,749,529 | A | | 5/1998 | Kazama et al. |
| 5,924,631 | A | | 7/1999 | Rodrigues et al. |
| 6,045,053 | A | | 4/2000 | Ruud |
| 6,056,215 | A | | 5/2000 | Hansinger et al. |
| 6,959,884 | B2 | | 11/2005 | Lacchia |
| 6,971,785 | B2 | | 12/2005 | Murphy et al. |
| 7,150,585 | B2 | | 12/2006 | Kleineidam et al. |
| 7,478,976 | B2 | | 1/2009 | Kleineidam et al. |
| 7,997,878 | B2 | | 8/2011 | Fulkerson |
| 8,678,777 | B2 | | 3/2014 | Fulkerson |
| 2002/0121240 | A1 | | 9/2002 | Rehman et al. |
| 2003/0038193 | A1 | | 2/2003 | Rehman et al. |
| 2003/0160105 | A1 | | 8/2003 | Kelly |
| 2004/0015982 | A1 | | 1/2004 | Bailey |
| 2004/0061007 | A1 | | 4/2004 | Milojevic et al. |
| 2004/0159282 | A1 | | 8/2004 | Sanner et al. |
| 2005/0095071 | A1 | | 5/2005 | Kleineidam et al. |
| 2006/0144963 | A1 | | 7/2006 | Fulkerson et al. |
| 2006/0219824 | A1 | | 10/2006 | Alexander et al. |
| 2008/0205189 | A1 | | 8/2008 | Cedoz et al. |
| 2009/0107397 | A1 | | 4/2009 | Mather et al. |
| 2010/0243759 | A1 | | 9/2010 | Mauchle et al. |
| 2012/0038346 | A1 | | 2/2012 | Beuk et al. |

FOREIGN PATENT DOCUMENTS

| | | | |
|---|---|---|---|
| JP | 2006-521979 | A | 9/2006 |
| JP | 2006-334589 | A | 12/2006 |
| JP | 2007-502705 | A | 2/2007 |
| JP | 2008-534280 | A | 8/2008 |
| JP | 2009-106935 | A | 5/2009 |
| JP | 2012-040554 | A | 3/2012 |
| WO | 02/04127 | A2 | 1/2002 |
| WO | 2005/018823 | A2 | 3/2005 |
| WO | 2006/107935 | A1 | 10/2006 |

OTHER PUBLICATIONS

Japanese Patent Application No. 2015-505721: Notification of Reasons for Refusal dated Mar. 28, 2017, 4 pages.
International Search Report dated Sep. 11, 2013, for International Application No. PCT/US2013/029607.
Chinese Application No. 201380019783.1: First Office Action dated Jul. 20, 2016, 7 pages.

* cited by examiner

POWDER GUN CONFIGURABLE FOR SUPPLY FROM VENTURI OR DENSE PHASE PUMP

RELATED APPLICATION

This application is a divisional of U.S. patent application Ser. No. 14/388,450, filed Sep. 26, 2014, and published as U.S. Patent App Pub. No. 2015/0053797 on Feb. 26, 2015, which is a national phase entry under 35 U.S.C. § 371 of, and claims priority to, International Patent App. No. PCT/US2013/029607, filed Mar. 7, 2013, which claims the benefit of U.S. Provisional Patent App. No. 61/623,870, filed Apr. 13, 2012, the entire disclosures of which are fully incorporated herein by reference.

TECHNICAL FIELD OF THE DISCLOSURE

The inventions relate generally to material application devices that are used for spraying powder coating material onto a work piece or object. More particularly, the inventions relate to material application devices, for example powder spray guns, that receive powder coating material in dense phase.

BACKGROUND OF THE DISCLOSURE

A material application device is used to apply powder coating material to an object, part or other work piece or surface. A material application device is also referred to herein as a spray gun. The powder coating material can be delivered from a powder pump to a spray gun in dilute phase or dense phase. Dilute phase refers to a powder stream that is a lean mixture, or in other words has a high ratio of flow air to powder. Dilute phase powder pumps are most commonly used in the form of a Venturi style pump that uses a large volume of air to draw powder from a supply and push the powder to the spray gun. Dense phase refers to a powder stream that is a rich mixture, or in other words has a low ratio of flow air to powder. Dense phase pumps are commonly used in the form of a pump chamber that uses pressure to fill and empty a pump chamber but with a low flow air volume, referred to hereinafter as flow air. Because dense phase systems use less flow air, the powder hoses can be made smaller in diameter compared powder hoses used with dilute phase systems.

SUMMARY OF THE DISCLOSURE

In an embodiment presented in the disclosure, a spray gun includes a powder flow path that has an inlet end and an outlet end, with the powder flow path comprising a first portion with a first cross-sectional area, a second portion with a second cross-sectional area, and a transition portion with an expansion chamber that joins the first portion and said second portion. In an additional exemplary embodiment, the first cross-sectional area is less than the second cross-sectional area. In a further embodiment, the first portion of the powder flow path is adapted to receive powder from a dense phase pump. In another embodiment, the second portion is adapted to direct powder flow to a dilute phase nozzle. In further embodiments, the spray gun may have a bar mount or tube mount configuration.

In another embodiment, a spray gun includes a powder flow path that has an inlet end and an outlet end, with the powder flow path comprising a first portion with a first cross-sectional area, a second portion with a second cross-sectional area, and a transition portion with an expansion chamber that joins the first portion and said second portion. The transition portion comprises a member for adding air to powder coating material flowing into said second cross-sectional area. In an exemplary application, the spray gun receives powder from a dense phase pump and sprays powder in a dilute phase through a spray nozzle. In still a further embodiment, the flow air that is added to the powder may be adjustable so as to set or select the air/powder ratio that flows through the second cross-sectional area.

In another embodiment, a member for adding air to the powder flow may be a wear item that is easily replaceable without disassembly of the spray gun, particularly the spray gun body. In further embodiments, the spray gun may have a bar mount or tube mount configuration.

In another embodiment, a spray gun can be selectively configured to operate with a dense phase pump or a dilute phase pump for receiving powder coating material in dense phase, such as from a dense phase pump, for example, or in dilute phase, such as from a Venturi pump, for example. In a more specific embodiment, the spray gun includes a forward section that is joinable with either of two selectable rearward sections, and a powder flow path having an inlet end and an outlet end. The first selectable rearward section allows for a constant cross-sectional area powder flow path from the inlet end of the powder flow path to the outlet end of the powder flow path. The second selectable rearward section comprises a portion of the powder flow path and wherein the portion of the powder flow path comprises a first cross-sectional area and a second cross-sectional area with a transition portion of the powder flow path joining the first cross-sectional area and the second cross-sectional area. In a more specific embodiment, the first cross-sectional area is different from the second cross-sectional area. In a further embodiment, the transition portion comprises a member for adding air to powder coating material flowing into said second cross-sectional area. In another embodiment, the constant cross-sectional area is defined by a single piece powder tube that extends from the powder flow path inlet end to the powder flow path outlet end.

In all the embodiments, the spray guns may optionally have a bar mount configuration or a tube mount configuration. The spray guns also optionally may have a manual configuration or an automatic configuration. The spray guns may also optionally provide a charging electrode that is connectable to a high voltage source for applying electrostatic charge to the powder coating material during a coating operation.

These and other aspects and advantages of the present invention will be appreciated and understood by those skilled in the art from the following detailed description of the exemplary embodiments in view of the accompanying drawings.

DETAILED DESCRIPTION OF EXEMPLARY EMBODIMENTS

Figure 1:
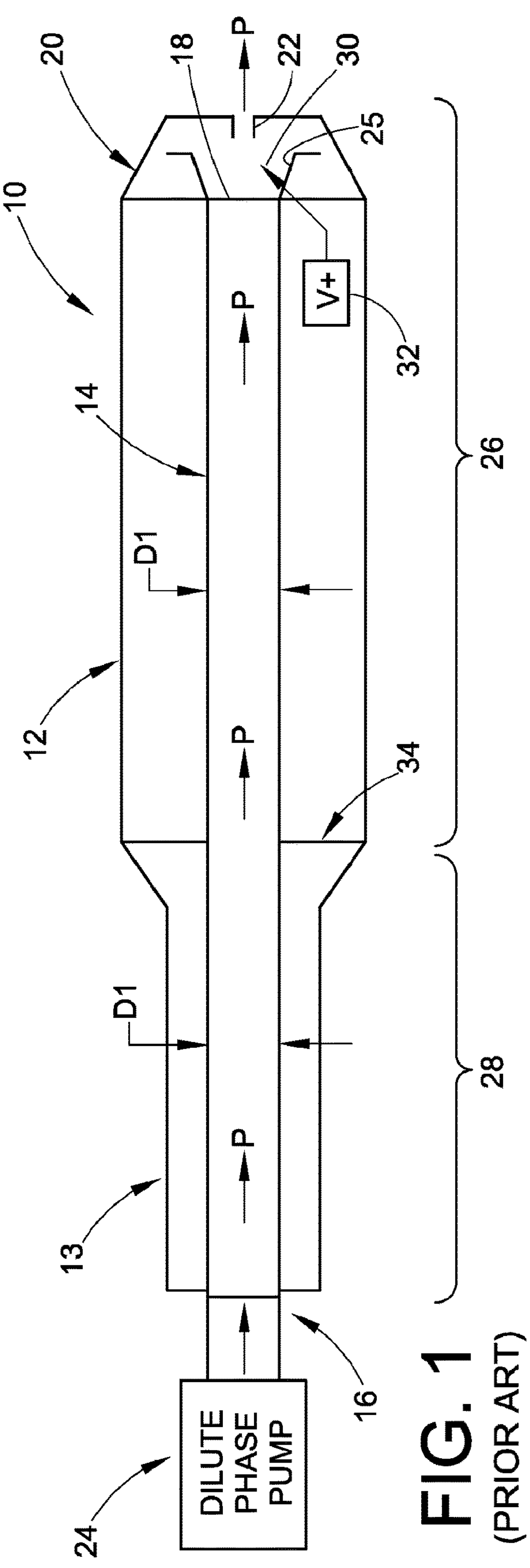
FIG. 1 (PRIOR ART)
FIG. 1 is schematic representation of a prior art spray gun that operates with dilute phase powder.

Although the inventions are described in terms of exemplary embodiments of spray guns with specific configurations, those skilled in the art will readily appreciate that the inventions will find application and use with many different types of spray gun designs. For example, automatic sprays guns may have mounting configurations other than bar mount or tube mount, and manual guns can have many different configurations. An automatic spray gun is one that is typically mounted on a support structure that can move the spray gun into position for a coating operation, with the spray gun actuation (for example, trigger on and off times for controlling spraying) being controlled electronically. A manual spray gun is usually manually gripped by the operator and triggered manually to start and stop a coating operation. The exemplary embodiments also use an electrode that is connectable to a high voltage supply, for example a multiplier, so as to apply electrostatic charge to the powder coating material, but the inventions also may be used with spray guns that are not corona discharge type electrostatic spray guns. For example, the inventions may be used with tribo-charging electrostatic spray guns or non-electrostatic spray guns.

Specific embodiments of various components used with the spray guns disclosed herein are exemplary and may be changed depending on the particular spray gun design and application.

A powder coating operation or coating operation for short as used herein refers to the common method of using a powder spray gun to produce a cloud of powder coating material that is directed at an object being coated. Powder coating operations may be electrostatic or non-electrostatic as is well known.

We use the term "hybrid" or "hybrid configuration" herein as a convenient reference to a spray gun, in accordance with the teachings of the present disclosure and inventions, that receives a dense phase powder flow from a powder pump, for example, a dense phase pump that provides dense phase or rich powder flow into the spray gun, through a first diameter flow passage; and wherein the hybrid spray gun has a forward section that sprays powder that has been diluted by adding air into the dense phase powder flow within the spray gun. The forward section of the spray gun may be, for example, the same as a spray gun that is used with powder supplied by a Venturi pump. Thus, it is a "hybrid configuration" in that a dense phase powder and dilute phase powder flow through the spray gun. The hybrid spray gun may also provide an expansion chamber within the spray gun for powder to flow to a spray nozzle through a second diameter flow passage that is larger than the first diameter flow passage.

Those skilled in the art will appreciate that powder flow passages, such as provided by powder tubes, are typically cylindrical in shape, but that non-cylindrical conduits may alternatively be used. Such powder tubes have an internal cross-sectional area but not necessarily an inside diameter. For the cylinder shaped powder tubes, the diameter is an adequate reference for comparing powder tubes of different size. Therefore, although in the disclosure herein we generally refer to diameter of exemplary powder tubes. We do not exclude from the scope of the inventions, however, the alternative use of non-tubular powder conduits with which size comparisons may be referenced to cross-sectional area.

Although the exemplary embodiments are described in terms of use with Venturi pumps that produce a dilute phase powder flow and dense phase pumps that produce a dense phase powder flow, such terminology should not be construed as limiting the use and scope of the inventions. Precise definitions of dilute phase and dense phase are not critical to the present inventions because the inventions allow for spray guns that can operate with dilute phase powder flow, dense phase powder flow or powder flow across a continuum of air/powder ratios in between dense phase and dilute phase. But for description purposes, a dilute phase powder flow is the type of powder flow that is produced by a Venturi style powder pump, meaning that the powder flow has a lean mixture of powder to air due to the high volume or amount of flow air (compared with a dense phase powder pump) that is generated by the Venturi pump. A dense phase powder flow is the type of powder flow that is produced by a dense phase pump in which the powder flow has a rich mixture of powder to air due to the low volume or amount of flow air (compared with a Venturi pump) that is generated by the dense phase pump. Dense phase pumps have smaller diameter powder hoses that provide dense phase powder to the spray gun as compared to the powder hoses that provide dilute phase powder from Venturi pumps due to the use of less flow air. For the basic concepts and embodiments herein, a dense phase powder flow is a powder flow produced by a dense phase pump that has a richer mixture of powder to air as compared to a dilute phase powder flow produced by a Venturi pump.

By way of introduction, the present disclosure presents a number of inventions and inventive concepts as embodied in the examples illustrated in the drawings and explained in the specification. One such inventive concept contemplates a configurable spray gun having two or more selectable configurations. In an embodiment, a configurable spray gun in a first configuration has a forward section that may be used to spray a lean mixture powder flow that is supplied from a dilute phase pump, for example a Venturi style pump. The dilute phase powder is fed to a first selectable rearward section of the spray gun. Or alternatively, the configurable spray gun in a second configuration may be configured as a hybrid spray gun in which the forward section may selectively be used to spray powder that is supplied as a rich mixture powder flow from a dense phase pump to a second selectable rearward section of the spray gun.

Another inventive concept contemplates in an embodiment a spray gun that receives a powder flow from a dense phase pump, for example a powder flow mixture that is richer than a powder flow mixture produced by a Venturi pump, but that sprays the powder through a spray nozzle that is otherwise used for dilute phase coating operations using powder supplied by a Venturi pump.

In another embodiment, a spray gun provides a transition portion of the powder flow path that adjusts for the different powder flow path cross-sectional areas for dilute phase and dense phase flow, irrespective of whether a particular powder flow or pump that supplies the powder flow to the spray gun fits within a recognized definition of dilute phase or dense phase, or otherwise has an air/powder ratio other than what might be called a dense phase or dilute phase. The transition from a richer powder flow to a leaner powder flow optionally may be augmented by adding air through a member into the richer powder flow.

Another inventive concept contemplates a structure that allows quicker and easier replacement of a wear item inside a spray gun without having to disassemble the spray gun housing. In an embodiment, the wear item can be installed and removed from the spray gun as a subassembly through a powder inlet end of the spray gun with disassembly of the spray gun housing. Additional embodiments of this concept are presented herein.

In another embodiment, a member for adding air to a dense phase powder flow may be a filter or other item that over time exhibits wear and is replaceable as part of routine maintenance or repair. The member may be optionally designed to be easily replaceable as part of a removable subassembly without disassembly of the spray gun outer structure, for example, the spray gun body. By outer structure, as an example, we refer to the exemplary embodiments that use a spray nozzle, optional nozzle nut, a gun body or gun body sections, an extension section (such as the mount tube hereinbelow) and an end cap with retaining nut as described herein below. The outer structure components will depend on the specific spray gun design, but the replaceable wear item concept herein refers to being able to easily replace the wear item by releasing a wear item subassembly without having to disassemble the basic outer gun body and related parts. Additional embodiments of this concept are disclosed herein.

While various aspects and features and concepts of the inventions are described and illustrated herein as embodied in various combinations in the exemplary embodiments, these various aspects, features and concepts may be realized in many alternative embodiments, either individually or in various combinations and sub-combinations thereof. Unless expressly excluded herein all such combinations and sub-combinations are intended to be within the scope of the present invention. Still further, while various alternative embodiments as to the various aspects and features of the invention, such as alternative materials, structures, configurations, methods, devices and so on may be described herein, such descriptions are not intended to be a complete or exhaustive list of available alternative embodiments, whether presently known or later developed. Those skilled in the art may readily adopt one or more of the aspects, concepts or features of the various inventions into additional embodiments within the scope of the present inventions, even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present inventions however, such values and ranges are not to be construed in a limiting sense and are intended to be critical values or ranges only if so expressly stated. Additionally, even though some features and aspects and combinations thereof may be described or illustrated herein as having a specific form, fit, function, arrangement or method, such description is not intended to suggest that such descriptions or illustrated arrangements are required or necessary unless so expressly stated. Those skilled in the art will readily appreciate additional and alternative form, function, arrangement or methods that are either known or later developed as substitute or alternatives for the embodiments and inventions described herein.

With reference to FIG. 1, a prior art automatic spray gun 10 may include a front gun body 12 and a rear gun body 13 that house various components of the spray gun. The embodiments of a tube mount configuration and a bar mount configuration relate to automatic spray guns as is known in the art. We also present an embodiment of a manual spray gun hereinbelow. The gun bodies 12, 13 may have multiple sections or pieces as needed. The housed components may include, for example, a powder flow passage, which may be realized as a powder tube 14, that defines a powder flow path P through the spray gun 10 from a powder flow path inlet 16 to a powder flow path outlet 18. The spray gun 10 typically also includes a spray nozzle 20 having a spray outlet 22. Powder flows from the powder flow path outlet 18 and into the spray nozzle 20 and then out the spray outlet 22. An example of a spray gun as represented in FIG. 1 is an Encore® model spray gun which is available commercially from Nordson Corporation, Westlake, Ohio. The prior art spray gun 10 commonly uses a powder flow path P that may have a constant inside diameter D1 powder tube 14, or more precisely a powder tube with a constant transverse cross-sectional area from the inlet end 16 to the outlet end 18. This promotes better flow characteristics and allows the powder tube cross-sectional area to be designed with the spray nozzle and spray outlet to obtain desired spray patterns. Having a single size powder tube also facilitates purging and color change.

The spray gun 10 of the prior art is designed to function as a dilute phase spray gun using a Venturi pump. Additionally, it is known to provide a spray gun that receives a dense phase powder flow from a dense phase pump. There are significant differences between the two spray gun designs due to the characteristics of the powder flow stream, and therefore the spray gun designs, and especially the spray nozzles and the powder tubes and hoses, are different for dense phase and dilute phase spray guns and coating operations. This has resulted in the need for having spray gun parts inventory for both style spray guns. In the exemplary embodiment of FIG. 1, the Encore® model spray gun uses dilute phase powder supplied from a dilute phase pump 24, for example, a Venturi powder pump. Accordingly, the powder tube 14 may be, although need not be, a single piece tube, or otherwise have a constant diameter D1 or cross-sectional area from the powder flow path inlet 16 to the powder flow path outlet 18. Because the prior art spray gun 10 is used for spraying dilute phase powder flow, a frusto-conical portion 25 of the flow path may be provided at or very near the spray nozzle 20. This frusto-conical portion 25 allows the dilute phase powder flow to decelerate and further diffuse to facilitate spray pattern shaping from the spray nozzle 20.

The spray gun 10 can be thought of as having a forward section 26 and a rearward section 28. The forward section 26 includes the spray nozzle 20, may also include an optional charging electrode 30 and a high voltage multiplier 32 that is electrically connected with the electrode 30. In some spray guns the multiplier 32 may be located in the rearward section 28. In FIG. 1 the location of the multiplier 32 is shown schematically.

Figure 2:
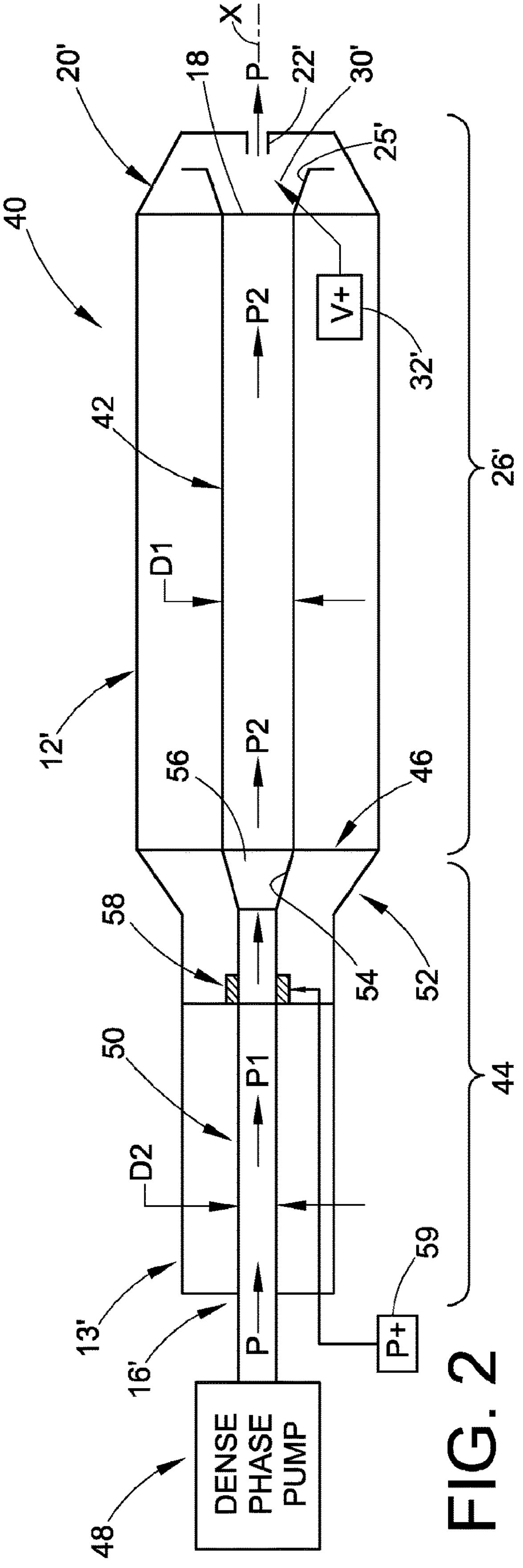
FIG. 2 is a schematic representation of a spray gun in accordance with the teachings and inventions in this disclosure.

With reference to FIG. 2, we illustrate a hybrid spray gun 40 that shares many of the same components as the spray gun 10 of FIG. 1, but with several different features. Parts that may be the same, although they need not be in all cases, are given the same reference numerals as the embodiment of FIG. 1 but with a prime (') marker. Accordingly, the spray gun 40 may include a forward section 26' that is the same or has many of the same components as the forward section 26 in the spray gun 10. For example, the forward section 26' in the spray gun 40 may include the same nozzle 20' and spray outlet 22', the same front gun body 12', the same electrode 30', and the same multiplier 32'. Other internal components of the forward section 26' may also be the same. The powder tube, however, will be somewhat different, at least in the rearward section. In the forward section 26', a first or front powder flow passage provided, for example, by a first or front powder tube 42 may have the same diameter D1 or cross-sectional area as the powder tube 14, but the front powder tube 42 will be shorter in length than the powder tube 14 because the front powder tube 42 extends only through the forward section 26'. In the hybrid spray gun 40, the forward section 26' may operate in the same manner as the forward section of the prior art spray gun 10 in FIG. 1 and have similar components. The rearward section 44 may also share many of the same components as the rearward section 28 in the spray gun of FIG. 1, but with additional features and structures described hereinbelow.

For both the prior art spray gun 10 and the hybrid spray gun 40, the forward sections 26, 26' and their respective rearward sections 28, 44 may be separated by a respective bulkhead 34, 46. The bulkheads are different for the two spray guns of FIGS. 1 and 2 for reasons that will be apparent below. But the bulkheads 34, 46 provide a convenient reference location for identifying the common forward sections 26, 26' and the different rearward sections 28, 44.

The exemplary hybrid spray gun 40 may use a rich powder flow supplied from a dense phase powder pump 48. The hybrid spray gun 40 therefore is unique in that it receives a dense phase powder flow from a dense phase powder pump 48, yet sprays the powder through a dilute phase forward section 26', particularly the spray nozzle 20', with the inclusion of an expansion chamber and diffuser air provided within the spray gun 40. The dilute phase forward section 26' for convenience may be but need not be the same as the forward section 26 of the Encore® model spray gun.

It should be noted that when we refer herein to a dense phase pump, we refer to a pump that produces a powder flow that has a higher ratio of powder to flow air as compared with a dilute phase pump, for example a common Venturi style powder pump. As it pertains to the exemplary embodiments, a dense phase powder flow will use a powder hose from the dense phase pump to the spray gun, as well as a powder flow passage within the spray gun, that has a smaller diameter or cross-sectional area than the powder hose and the powder flow passage in the spray gun used with a Venturi or other dilute phase pump.

The rearward section 44 includes a second or rear powder flow passage provided, for example, by a second or rear powder tube 50 that may be smaller in diameter D2 or cross-sectional area compared to the diameter D1 or cross-sectional area of the single powder tube 14 of FIG. 1 and the front powder tube 42. This is because the powder flow from the dense phase pump 48 has less flow air. In further accordance with the present teachings, a transition section 52 is provided, optionally as part of the rearward section 44, to interface the smaller diameter D2 or cross-sectional area of the rearward section powder tube 50 with the larger diameter D1 or cross-sectional area of the forward section powder tube 42. The transition section 52 in the exemplary embodiment includes an expansion chamber 54 that provides a transition portion 56 of the powder flow path P between the smaller diameter portion P1 of the powder flow path in the rearward section 44 and the larger diameter portion P2 of the powder flow path in the forward section 26'. Therefore, for the hybrid spray gun 40, the powder flow path P includes the smaller diameter portion P1, the transition portion 56 and the larger diameter portion P2. For convenience and reference, we indicate a longitudinal axis X of the spray gun 40 that corresponds with direction of the powder flow paths P, P1 and P2. We do not require, however, that in all embodiments and alternative designs that that the powder flow paths P, P1 or P2 only extend along a single axis X.

Figure 5:
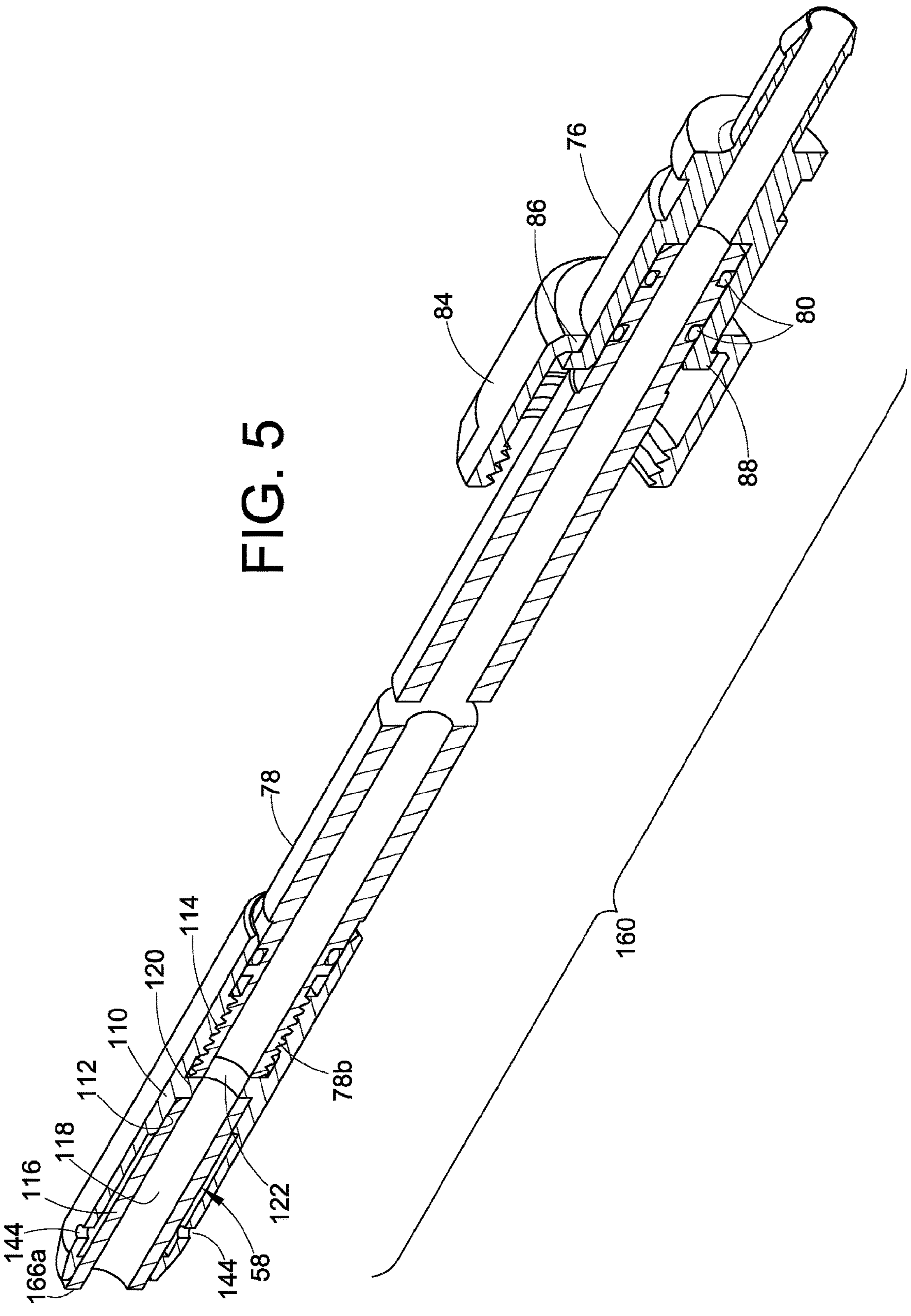
FIG. 5 is an isometric view of an air diffuser subassembly that may be used with the spray gun of FIG. 2.

As another optional feature of the present teachings, along with the transition section 52 that provides an interface between the smaller and larger diameter portions P1 and P2 of the powder flow path P, we provide structure for adding air to the dense phase powder flow prior to the powder flow entering the spray nozzle 20'. In the exemplary embodiment, we provide a member 58 that allows air to pass into the powder flow path P. In one embodiment, the member 58 may be realized in the form of an air diffuser made of air porous material, for example, sintered polyethylene. The air diffuser 58 may be in the form of a cylindrical body (116, FIG. 5) enclosed in a volume that receives pressurized air from an air source 59. Optionally, controls (not shown) may be provided to adjust the flow rate of air into the powder flow P so as to control the air/powder ratio to change the powder flow from dense phase to dilute phase or some other desired air/powder ratio that is less dense than the powder flow produced by the pump 48, whether that desired ratio would fit within a definition or understanding of dilute phase powder flow or not.

For alternative embodiments, rather than the use of an air diffuser 58 as described herein, the transition section 52 may provide an expansion chamber 54 structure for the transition portion 56 of the powder flow path in which holes or air jets are provided into the expansion chamber 54 interior to allow diffuser air to pass into the powder flow. Another alternative would be to include an expansion chamber 54 structure in which the expansion chamber 54 comprises an air porous material. For example, an air porous member may be disposed within the expansion chamber 54, or just past the front end (54*b*, FIG. 4) of the expansion chamber 54. We prefer but do not require the concept of an air diffuser 58 as set forth in the exemplary embodiments herein because this concept facilitates an embodiment of an easily removable wear item subassembly as taught hereinbelow.

Thus, in a basic embodiment of the first inventive concept, a spray gun includes a first powder flow path portion that is adapted to receive powder coating material with a richer powder/air ratio, for example from a dense phase pump. The spray gun also includes a second powder path flow portion that is adapted to direct powder coating material with a leaner powder/air ratio to a spray nozzle that sprays dilute phase powder. The spray gun includes a transition portion of the powder flow path that interfaces the first powder flow path portion with the second powder flow path portion. In an exemplary embodiment, the powder flow path is defined by a first powder tube having a first diameter and a second powder tube having a second diameter that is larger than the first diameter, with the transition section providing an expansion chamber to interface the two different sized powder tubes. The basic embodiment may optionally include a member for adding air to the powder flow in order to dilute the richer powder flow.

Although we described the embodiments of FIGS. 1 and 2 in terms of the forward sections 26, 26' and the rearward sections 28, 44 as being delimited by the respective bulkheads 34, 46, such is done as a convenient location reference but is not required to be the physical separation of the forward and rearward sections. Based on the above description, it will be appreciated that the identification of the forward section 26' and the rearward section 44 for the hybrid gun 40 is the reference location where the transition portion 56 of the powder flow path ends and the larger diameter portion P2 of the powder flow path begins. In the exemplary embodiment, this reference location is at the bulkhead 46 but this is not required. This terminology and reference location is useful in understanding the next described inventive concept.

It is important to note that even though we show an exemplary embodiment of a prior art spray gun in FIG. 1 and how that gun can be modified to the structure of FIG. 2, the same concepts can be applied to many other spray gun designs and configurations. One of the important teachings herein is that a known spray gun configuration that operates from a dilute phase powder pump can be selectively configured, modified or initially assembled as the case may be, while using many of the same parts, to be alternatively configured to operate from a dense phase powder pump, but with a dilute phase spray output. Prior to this disclosure, such a modification using a substantial number of like components was not known. Therefore, another inventive concept that is presented in this disclosure is a configurable spray gun that in a first selectable configuration operates from a dense phase powder pump, and in another selectable configuration operates from a dilute phase pump. In either selectable configuration, the spray gun sprays a diluted or leaner powder flow.

FIGS. 1 and 2 comparatively exemplify the first inventive concept of a configurable spray gun. A first selectable configuration is the spray gun 10 which receives a dilute phase powder flow and sprays the powder from a spray nozzle as a dilute phase, with the powder preferably passing through a powder flow path of constant diameter. A second selectable configuration is a spray gun 40 (also referred to herein as a hybrid spray gun) that receives a dense phase powder flow and sprays the powder from a spray nozzle as a dilute phase. Both selectable configurations may share a common forward section that uses the same components. A configuration is selected by selecting one of two rearward sections that may share many common components, but wherein one of the selectable rearward sections allows for a continuous dilute phase powder flow path, and the other selectable rearward section comprises a transition portion of the powder flow path that provides an interface between a dense phase powder flow path and a dilute phase powder flow path. Thus, with the use of a few different parts, a spray gun can be assembled in either of two selectable and different configurations with most of the parts for both configurations being the same.

It should be noted that the first and second concepts may be related but are individually unique and advantageous. The hybrid spray gun that receives dense phase powder and sprays dilute phase powder may be designed independent of any other spray gun configuration. However, when based on a dilute phase spray gun and with the use of common sections and parts, the hybrid spray gun allows for a configurable spray gun design.

Figure 3:
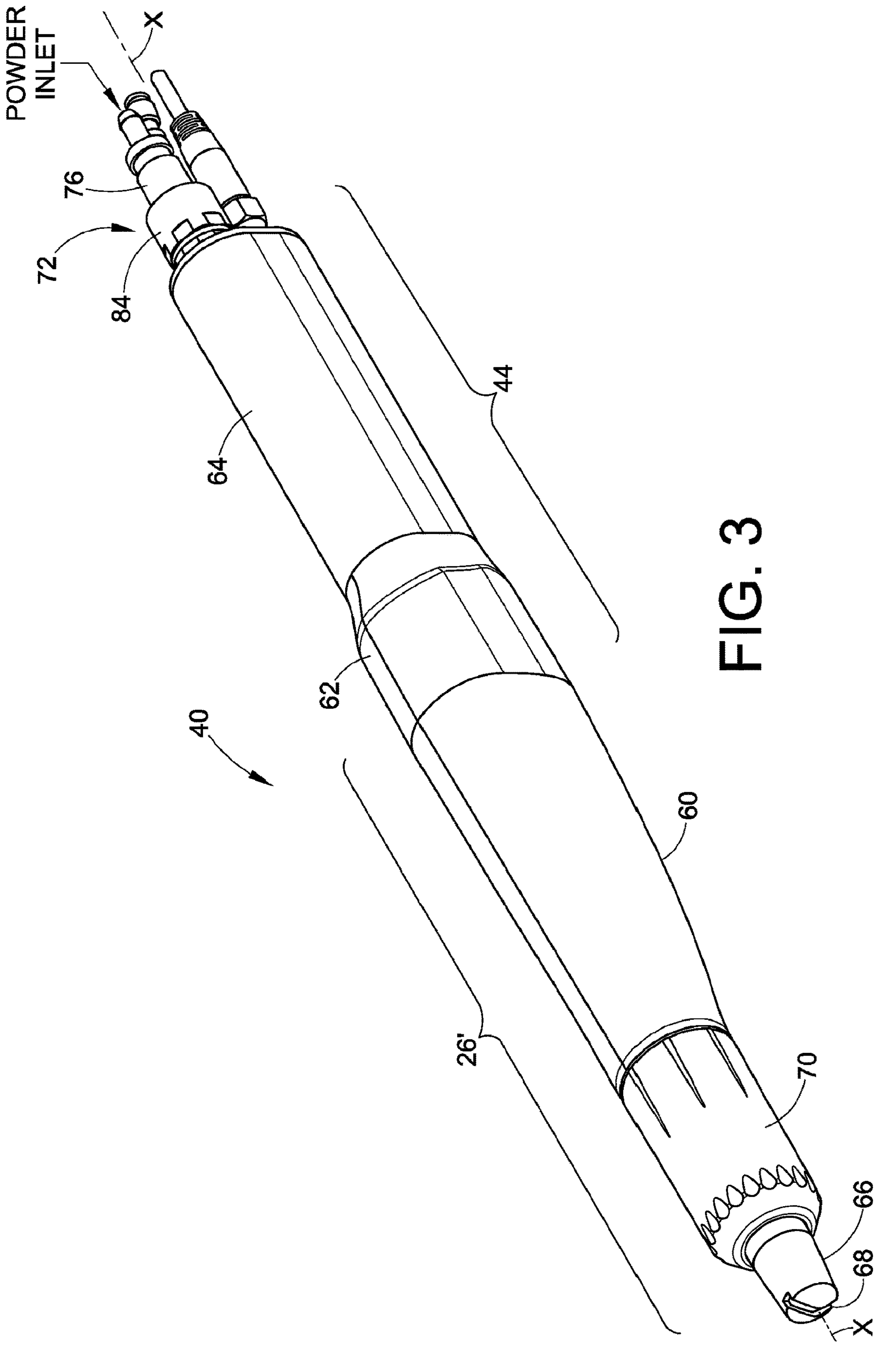
FIG. 3 is an isometric view of a first embodiment of a hybrid spray gun in a tube mount configuration.
Figure 4:
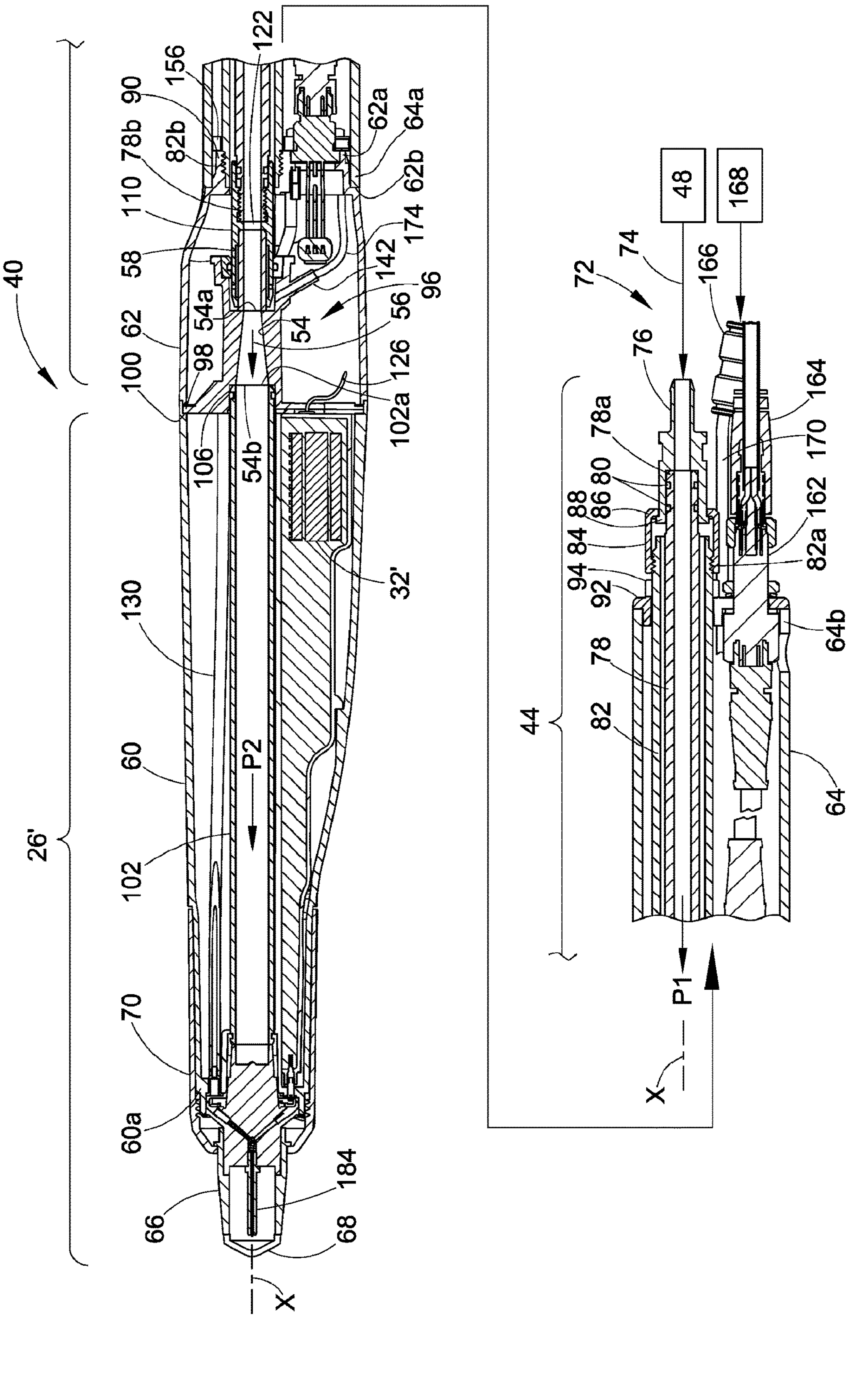
FIG. 4 is an elevation view of the hybrid spray gun of FIG. 2, in longitudinal cross-section.

Turning next to FIGS. 3 and 4, in a first embodiment, the spray gun 40 is presented in a tube mount configuration. The spray gun 40 includes the forward section 26' and the rearward section 44. The forward section includes a front gun body 60 (that corresponds to 12' of FIG. 2) and a rear gun body 62. For the exemplary embodiment, the rear gun body 62 corresponds with the transition portion 52 of FIG. 2. A mount tube 64 extends rearward and may have a length that is selected as needed for a particular coating operation. The mount tube 64 may be in the range of a foot in length to several feet in length. The mount tube 64 is not necessarily shown to scale length in FIGS. 3 and 4. A tube mount configuration generally refers to an arrangement in which the spray gun is supported on a gun mover (not shown), for example a reciprocator, oscillator or other apparatus that is used to position the spray gun within a spray booth (not shown) for a coating operation. The spray gun 40 is mounted on the gun mover, for example, by a clamp or other gripping mechanism that is attached to the mount tube 64 at a suitable location (not shown).

A spray nozzle 66 (which corresponds to spray nozzle 20' in FIG. 2 and optionally may be the spray nozzle 20 of FIG. 1) is mounted at a front end 60*a* of the front gun body 60, and includes a nozzle spray outlet 68. The spray outlet 68 may be in the form of a slot or other geometry that produces a desired spray pattern. The spray nozzle 66 is held against the front gun body 60 by a nozzle nut 70 that may have a threaded engagement with the front end 60*a* of the front gun body 60.

The spray gun 40 has a powder inlet end 72 at the back end of the spray gun. Powder coating material is supplied to the spray gun 40 from the powder pump 48, for example, a dense phase pump. A powder hose 74 (FIG. 4) connects an outlet of the powder pump 48 to an inlet hose connector 76 at the spray gun 40 back end. The inlet hose connector 76 slides onto the back end of a first or rear powder tube 78 (which corresponds to the powder tube 50 in FIG. 2) and may be sealed against the exterior surface of the rear powder tube 78 with seals 80 such as o-rings for example. The rear powder tube 78 telescopes through a clamp tube 82 which functions as a tie bar. The clamp tube 82 has a threaded first end 82*a* and a threaded second end 82*b*. The threaded first end 82*a* mates with a threaded retaining nut 84. The threaded nut 84 includes an inward lip 86 that engages a flange 88 on the hose connector 76, so that when the nut 84 is tightened onto the clamp tube 82, the hose connector 76 is pulled up against the back end 78*a* of the rear powder tube 78 (as explained further below, the rear powder tube 78 may be part of an assembly that facilitates removal and insertion of an air diffuser by simply unthreading the retaining nut 84 from the clamp tube 82). The back end 78*a* of the rear powder tube 78 corresponds to the powder flow path inlet 16 in FIG. 2.

The second threaded end 82*b* of the clamp tube 82 is screwed into a threaded opening 90 in the back end 62*a* of the rear gun body 62. The mount tube 64 has a front end 64*a* that abuts an outer shoulder 62*b* of the rear gun body 62. The mount tube 64 surrounds much of the clamp tube 82, but a back end 64*b* of the mount tube 64 abuts an end cap 92 that is held in place on the clamp tube 82 by a threaded clamp nut 94. Therefore, when the clamp tube 82 is tightened to the back end 62*a* of the rear gun body 62, the mount tube 64 is axially held in compression against the rear gun body 62.

Figure 6:
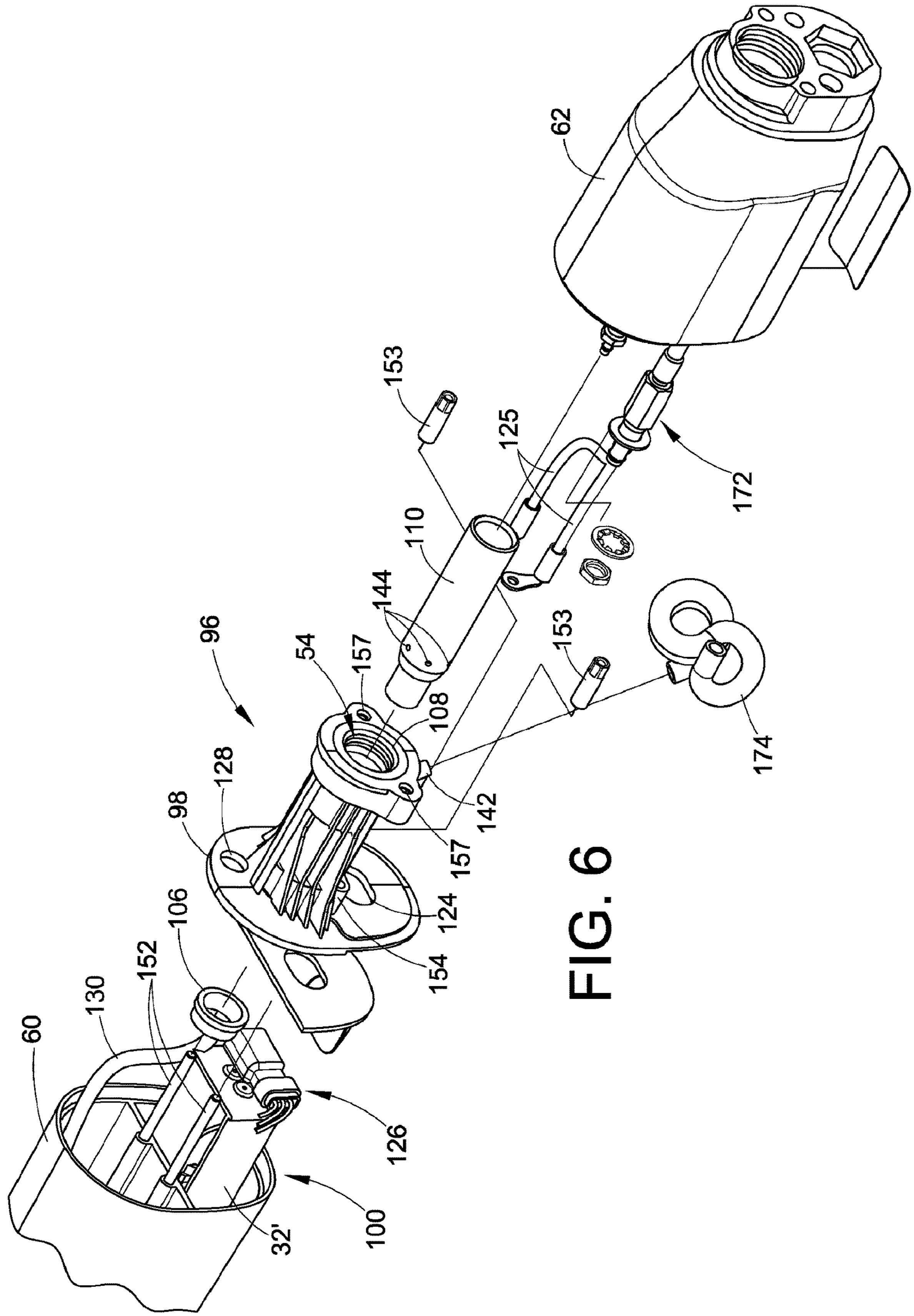
FIG. 6 is an exploded isometric rear view of a bulkhead used in the spray gun of FIG. 2.
Figure 7:
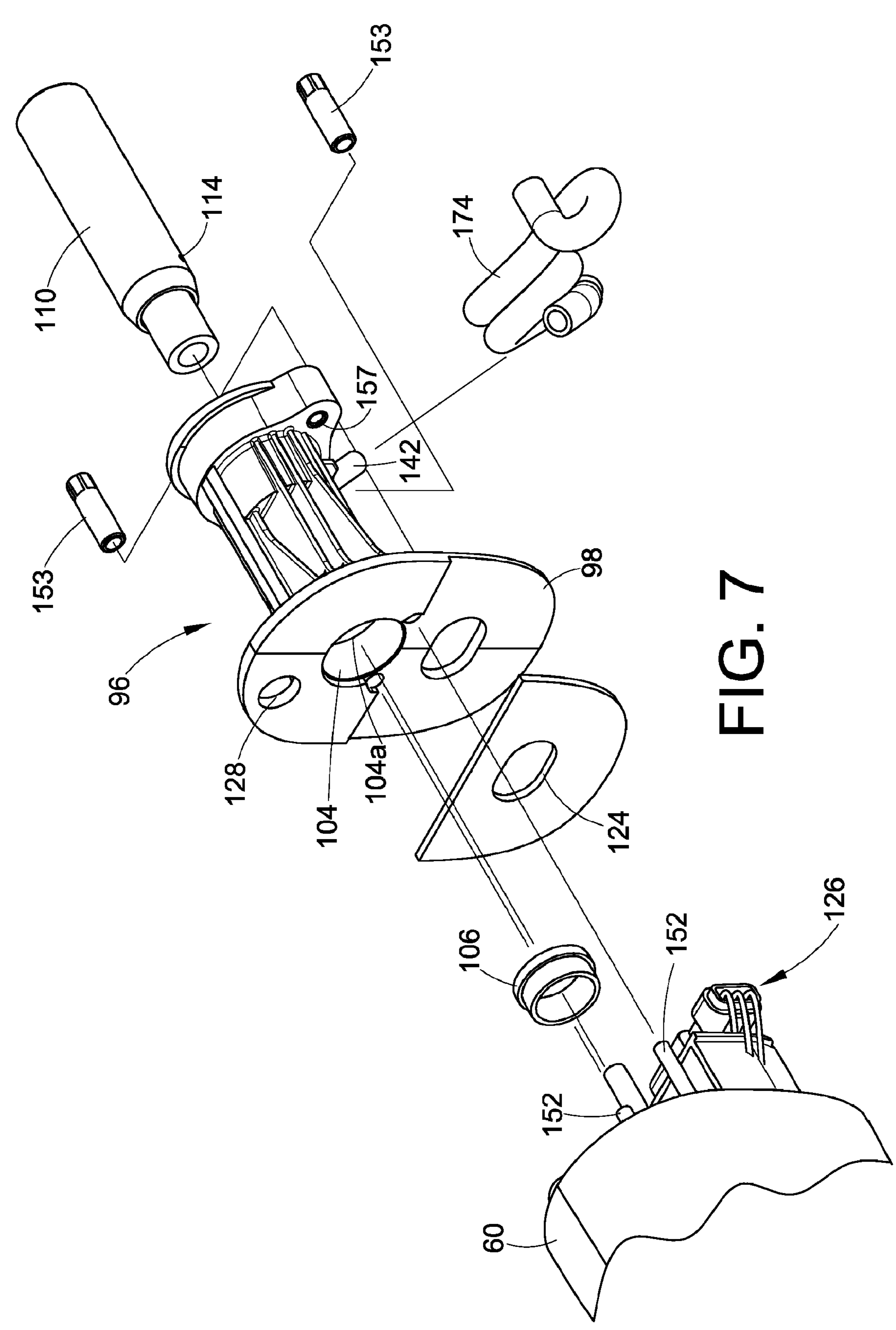
FIG. 7 is an exploded isometric front view of the bulkhead of FIG. 6.
Figure 10:
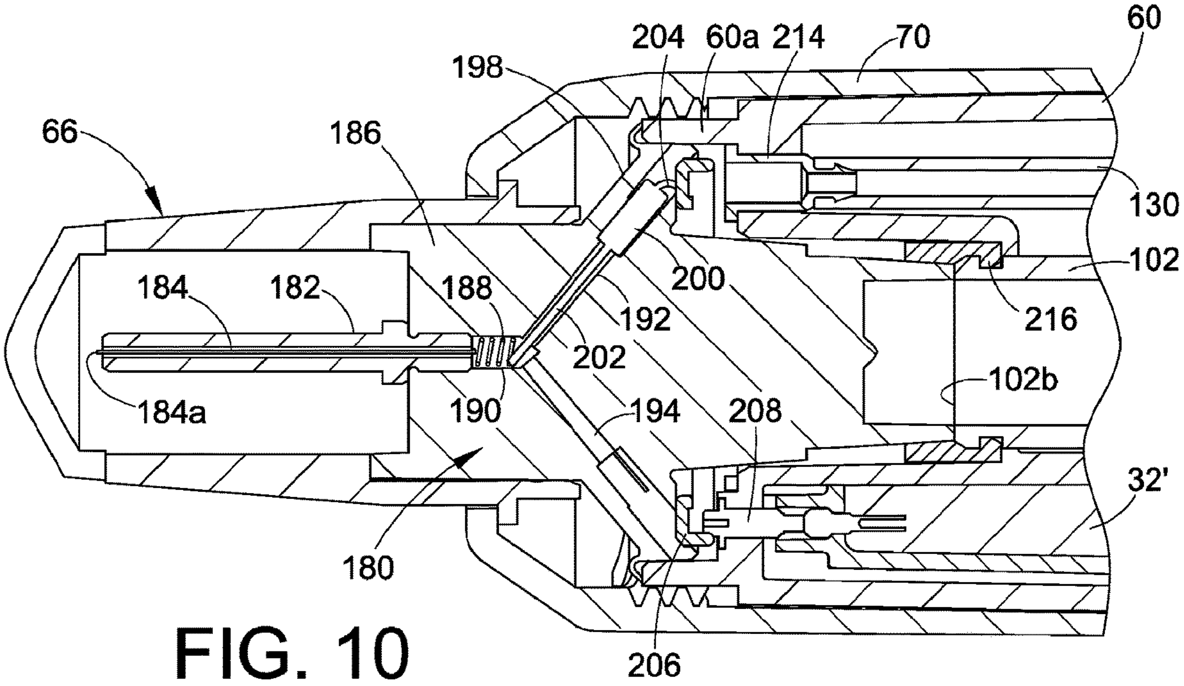
FIG. 10 is an enlarged view of the forward portion of the spray gun of FIG. 4.

With reference to FIGS. 4, 6 and 7, a bulkhead 96 is disposed at the back end of the front gun body 60. The bulkhead 96 covers the open back end of the front gun body 60. The bulkhead 96 includes a forward flange 98 that inserts into a bulkhead recess 100 in the front gun body 60 and up against the back end of the multiplier 32'. The forward flange 98 is captured when the rear gun body 62 is attached to the front gun body 60. The bulkhead 96 may be a molded plastic part that provides the expansion chamber 54. The expansion chamber 54 provides a transition portion of the powder flow path P as described with respect to FIG. 2, and in particular the expansion chamber 54 has a back end diameter or cross-sectional area 54*a* that preferably matches the diameter of the rear powder tube 78, and a front end diameter or cross-sectional area 54*b* that preferably matches the diameter of a front end powder tube 102 (the front powder tube 102 corresponds to the powder tube 42 in FIG. 2). The front powder tube 102 comprises a back end 102*a* (FIG. 8) and a front end 102*b* (FIG. 10). The front end 102*b* corresponds to the powder flow path outlet 18 of FIG. 2.

It should be noted that the expansion chamber 54 could alternatively be provided in a separate member or sleeve that interfaces with the bulkhead 96 rather than being integrated with the bulkhead 96. Further note that the rear gun body 62, along with the bulkhead 96 and the air diffuser 58 (also 116 described below) correspond to the transition section 52 of FIG. 2.

The front end of the bulkhead 96 includes a first recess portion 104 (FIG. 7). The back end 102*a* of the front powder tube 102 is inserted into the first recess portion 104, and a collar seal 106 (FIG. 8) may be used between the front powder tube 102 and the first recess portion 104. During assembly, the front powder tube 102 preferably is inserted from the front end of the spray gun 40, before the spray nozzle 66 is attached but after the bulkhead 96 has been secured against the front gun body 60, and seats in the first recess portion 104. The front powder tube 102 is inserted into the first recess portion 104 until the back end 102*a* of the front powder tube 102 abuts a shoulder 104*a* (FIG. 7). The front powder tube 102 is inserted into the first recess portion 104 of the bulkhead 96 and bottoms against the shoulder 104*a* so that the back end 102*a* of the front powder tube 102 has a smooth and preferably seamless interface with the front end 54*b* of the expansion chamber 54. Preferably, the expansion chamber front end 54*b* has an inside diameter or cross-sectional area that matches the inside diameter or cross-sectional area of the powder flow path P2 that is defined by the front powder tube 102.

The back end of the bulkhead 96 includes a second recess portion 108 (FIG. 6). A diffuser carrier 110 (also see FIG. 5) is disposed in the rear gun body 62. The diffuser carrier 110 includes a front end smooth walled recess 112 and a back end threaded recess 114. The rear powder tube 78 may have a threaded front end 78*b* that is screwed into the threaded back end recess 114 of the diffuser carrier 110 until the front end 78*b* of the back powder tube 78 bottoms against the divider wall 120. The front end recess 112 slideably receives the air diffuser 58 (FIG. 2 also) such that the back end of the air diffuser 58 bottoms against the divider wall 120. The air diffuser 58 may be a hollow cylinder of porous material that allows air to pass through a porous wall 116 of the air diffuser 58 into the interior volume 118 of the air diffuser 58. The diffuser carrier 110 may include a divider wall 120 with a flow hole 122 therethrough, so that powder will pass from the rear powder tube 78, through the air diffuser 58, through the expansion chamber 54 and then through the front powder tube 102. The divider wall 120 acts as a stop for the back powder tube 78 when it is threaded into the diffuser carrier 110, as well as the air diffuser 58 when it is inserted into the front end recess 112 of the diffuser carrier 110.

The forward end 116*a* (FIG. 8) of the porous wall 116 extends just past the forward end of the diffuser carrier 110. The diffuser carrier 110 is inserted into the smooth walled second recess portion 108 of the bulkhead 96 so that the forward end 116*a* of the porous wall 116 bottoms against a shoulder 108*a*. The forward end 116*a* of the porous wall 116 may have a smooth and preferably seamless interface with the back end 54*a* of the expansion chamber 54. Preferably but not necessarily, the back end 54*a* of the expansion chamber 54, the air diffuser 58 and the hole 122 in the diffuser carrier 110 have an inside diameter or cross-sectional area that matches the inside diameter D2 or cross-sectional area of the powder flow path P1 that is defined by the rear powder tube 78. An optional gasket 109 may be provided at the forward end 116*a* of the air diffuser 58 on a reduced diameter extension 116*b*. This gasket 109 can help prevent pressurized atomizing or diffuser air by-passing the air diffuser 58. The gasket 109 may be made of a suitable material, for example, a foam gasket.

As another alternative, the gasket 109 may be sized so that it has an inside diameter that is the same as the inside diameter of the porous wall 116 and the diameter of the back end 54*a* of the expansion chamber 54. This would provide a gasket that is disposed and compressed between the back end 54*a* and the air diffuser 116. In this alternative embodiment, the back end 54*a* of the expansion chamber 54, the gasket 109, the air diffuser 58 and the hole 122 in the diffuser carrier 110 will have an inside diameter or cross-sectional area that matches the inside diameter D2 or cross-sectional area of the powder flow path P1 that is defined by the rear powder tube 78.

With the spray gun 40 being connectable to the output of a dense phase powder pump 48, the back powder tube 78 will have a smaller inside diameter than the front powder tube 102. The front powder tube 102 has a larger diameter because the powder flow will be diluted with additional air as it passes through the transition section 52 of the spray gun 40 in order to be able to spray the powder through the spray nozzle 66 which is designed to spray dilute phase powder. The expansion chamber 54 thereby defines a transition portion 56 of the powder flow path P that connects the smaller diameter powder flow path P1 in the rearward section 44 with the larger diameter powder flow path P2 in the forward section 26'.

The bulkhead 96 further includes a first opening 124 in the flange 98 through which wires 126 can pass into the forward section 26'. The wires 126 are used to connect power to the multiplier 32' for spray guns that utilize electrostatic powder coating technology. The bulkhead 96 may include a second opening 128 through which an air tube 130 passes forward to the front end of the spray gun 40. This air tube 130 delivers pressurized air that functions as electrode wash air to help keep the electrode tip clean during coating operations (the electrode assembly is described hereinbelow).

Figure 8:
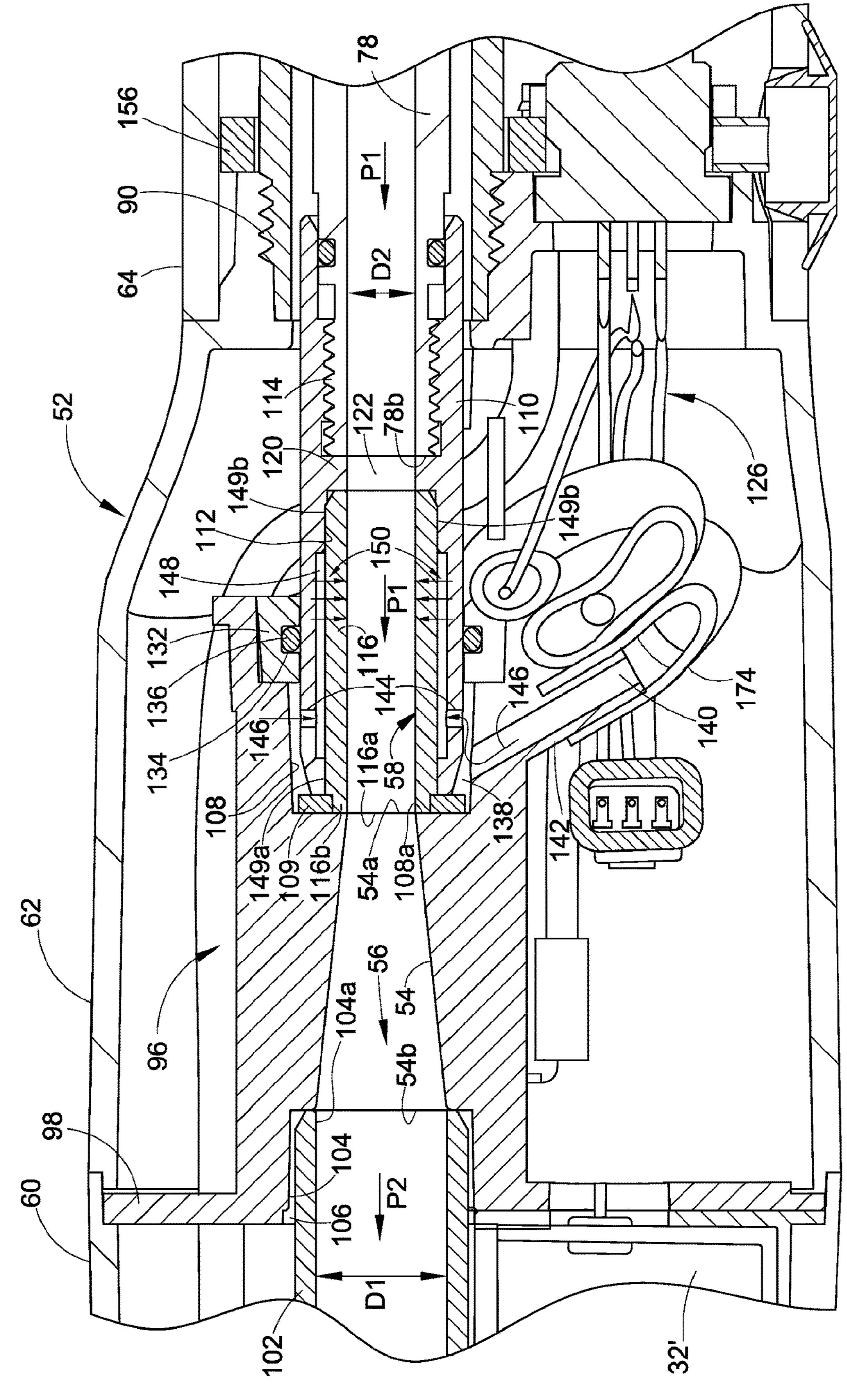
FIG. 8 is an enlarged view of a transition section of the spray gun of FIG. 4.

With reference to FIG. 8 an annular seal carrier 132 includes a seal groove 134 that retains a diffuser carrier seal 136, for example, an o-ring. A forward portion of the diffuser carrier 110 is inserted through the seal carrier 132 so that the front end 116*a* of the porous wall 116 abuts the shoulder 108*a* of the bulkhead 96. The second recess portion 108 of the bulkhead 96 provides a sealed chamber 138 about the forward portion of the diffuser carrier 110 that is forward of the diffuser carrier seal 136. An air passage 140 opens to the sealed chamber 138. The air passage 140 is formed in a tube stub 142 that is integral with the bulkhead 96. A diffuser air tube extension (174) is connected at one end to this tube stub 142, and is connected at an opposite end to a diffuser air fitting (172) which is connected to a source of pressurized air (described below). The diffuser carrier 110 includes one or more through holes 144. Pressurized diffuser air represented by the arrow 146 passes into the sealed chamber 138 from the air passage 140 and further flows through the holes 144 because the seal 136 seals against an outer surface of the diffuser carrier 110. The air diffuser 58 sits in the front recess 112 of the diffuser carrier 110 with clearance so as to be centered in a forward inner volume 148 of the diffuser carrier 110 that receives the pressurized diffuser air 146. An interference fit as at 149*a* and 149*b* may be used to support the porous wall 116 in the center of the diffuser carrier 110. The porous wall 116 passes diffuser air, as also represented schematically by the arrows 150, into the powder flow path P1 and mixes with the powder, thus diluting the powder flow. The amount of dilution based on the amount of diffuser air added into the powder flow path P1 can be selected based on the design of the spray nozzle and related parts at the front end of the spray gun. The added diffuser air thus can be used to dilute the dense phase powder that is received from the dense phase pump 48.

Figure 9:
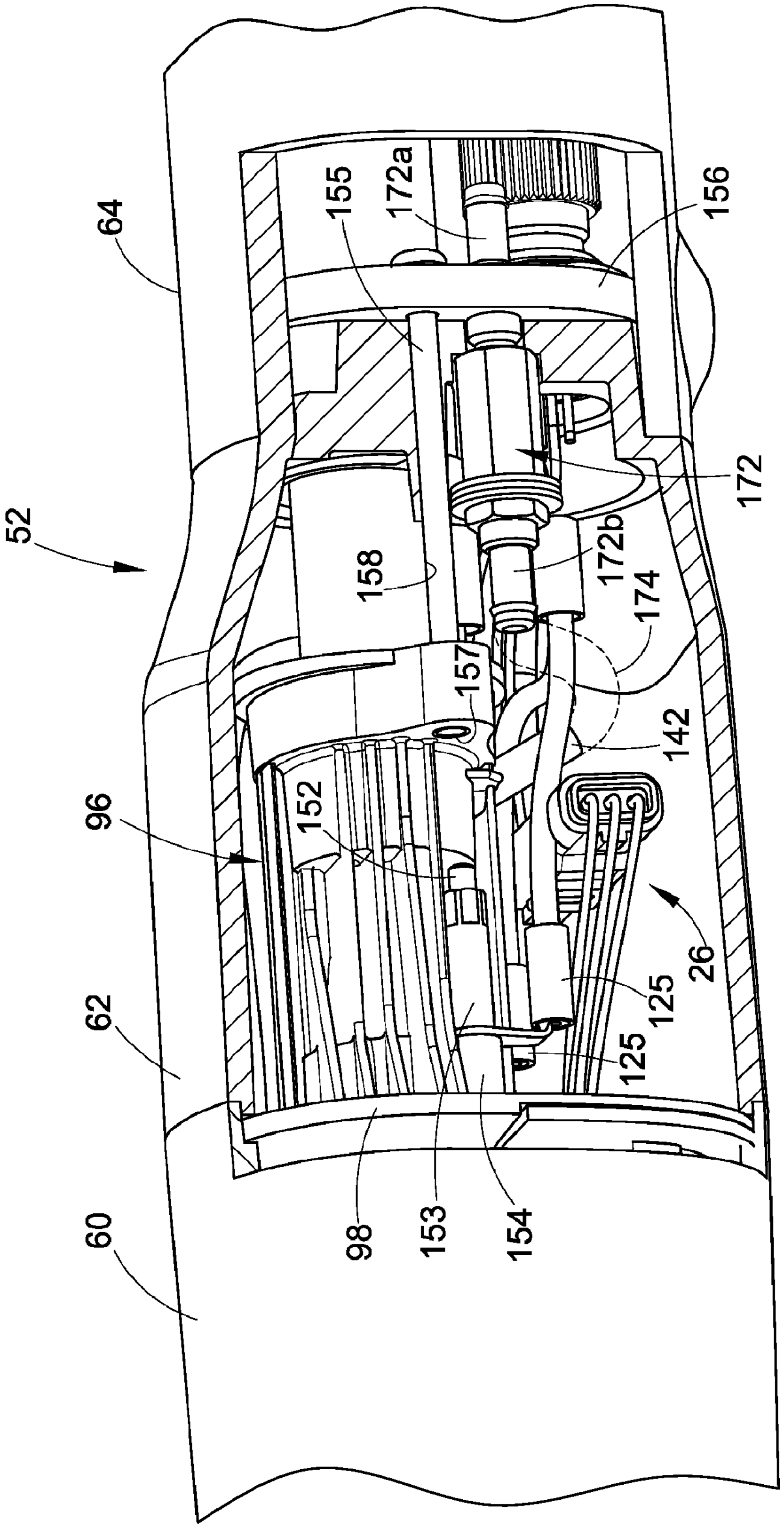
FIG. 9 is a partial cross-section in partial perspective of the transition section of the spray gun of FIG. 4.

With reference to FIGS. 6 and 9, the bulkhead 96 may be secured to the front gun body 60 using threaded studs 152 and nuts 153 that extend from the back of the front gun body 60 (FIG. 6) and through bosses 154 in the bulkhead 96. These mechanical connections may also be used for coupling electrical ground to the threaded studs 152 using grounding connectors 125 (see FIG. 9). The rear gun body 62 may be secured to the bulkhead 96 using screws 155 (only one is visible in FIG. 9) or other convenient means. The screws 155 may be used to join a grounding plate 156 (FIG. 4 also) to threaded inserts 157 that are provided in the bulkhead 96. The screws 155 thereby join the rear gun body 62 to the bulkhead 96, and the threaded studs 152 and nuts 153 secure the front gun body 60 with the bulkhead 96. The assembled spray nozzle 66, nozzle nut 70, front gun body 60, rear gun body 62 and the mount tube 64 thus are held together and form a housing that encloses most of the spray gun components, and especially the transition portion 56 of the powder flow path.

With reference again to FIGS. 4 and 5, the air diffuser 58 may over time lose porosity due to the powder flowing through therethrough. We consider the air diffuser a wear item in that it will need to be occasionally replaced. In order to avoid disassembly of the spray gun to reach the air diffuser, in accordance with another inventive concept we have designed the rear powder tube 78, the air diffuser 58 and the diffuser carrier 110 as an easily removable air diffuser subassembly 160. The subassembly 160 may optionally be considered to include the inlet hose connector 76 and the retaining nut 84. From FIG. 4 it will be noted that with the exception of the retaining nut 84, the entire air diffuser subassembly 160 is slideably inserted into the rear gun body 62 through the clamp tube 82 and snugs into the back end of the bulkhead 96 (FIG. 8). By simply loosening the retaining nut 84 free from the threaded end of the clamp tube 82, the entire subassembly 160 can be pulled out from the back end of the spray gun 160. This provides easy access to the air diffuser 58 for replacement or cleaning or other maintenance as needed. After the retaining nut 84 is loosened, the user can simply pull on the hose connector 76 and pull the subassembly 160 out of the otherwise fully assembled spray gun 40. The retaining nut 84 and the hose connector 76 are considered optional as part of the subassembly 160 in the sense that the subassembly can be removed by pulling on the hose connector 76 only if there is a sufficiently snug fit connection between the hose connector 76 and the rear powder tube 78. Otherwise, the retaining nut 84 can first be removed and then the rear powder tube 78 can be grasped and withdrawn from the spray gun body. Preferably, the air diffuser subassembly 160 can be removed without disassembly of the outer structure of the spray gun 40, meaning in the exemplary embodiments, various major parts like the spray nozzle 66, the nozzle nut 70, the front and rear gun bodies 60, 62 and the mount tube 64, along with items such as the clamp tube 82.

With reference to FIG. 4, at the back of the spray gun 40 is an electrical plug connector 162 receives an input connector 164 which may be connected at another end to a power supply (not shown). For example, the input connector 164 may include three wires for a 21 VDC supply that is used to power the multiplier 32', common and a current feedback signal wire. The electrical energy provided to the spray gun is coupled to the multiplier 32' via the multiplier input wires 126 as part of a cable that is routed through the rearward section 44 to the input connector 164. The inventions herein however may find application for non-electrostatic spray guns and coating operations.

With reference to FIGS. 4 and 9, at the back end of the spray gun 40 is a diffuser air fitting 166 that can be connected to a source of pressurized diffuser air 168. The diffuser air fitting 166 connects to a first end of a diffuser air tube 170 that is connected at another end to a first connection end 172*a* of a grounding plate diffuser air fitting 172 (FIG. 9). A diffuser air tube extension 174, such as for exampled a coiled tube, connects the tube stub 142 to a second connection end 172*b* of the grounding plate diffuser air fitting 172 (see FIGS. 6 and 7 also). In this manner, diffuser air 146 is supplied to the air diffuser 58 from the air source 168. It should be noted that the air source 168 may optionally be controlled, electronically or manually for example, to have a selectable air volume supplied to the spray gun 40 so that the amount of diffuser air 150 added to the powder flow can be adjusted as needed for a particular setup and coating operation.

Although we show the air diffuser 58 as being closely positioned relative to the expansion chamber 54, such is not required. The diffuser air may be added to the powder flow at any location, even prior to the powder entering the spray gun 40. However, we have found that having the diffuser air added closer to the spray nozzle 20' but at a distance so as to allow time for the diffuser air to dilute the powder flow into an enlarged powder flow path P2 (FIG. 2), better spray patterns can be obtained in various applications. Therefore in the exemplary embodiments we show the air diffuser 58 near the entrance to the expansion chamber 54. The location of the expansion chamber 54 also is a matter of design choice within the spray gun 40. But, we find that having an axial separation (for example, relative to the longitudinal axis X of the powder flow path P1, P2 through the spray gun) between the expansion chamber and the spray nozzle 20' provides more time for the powder flow to be diluted and form a more efficient flow pattern for spraying from the spray nozzle 20'.

Although not shown in the drawings, an electrode wash air fitting may be provided at the back end of the spray gun

40. This electrode wash air fitting receives pressurized air from an air supply and through a second air fitting in the grounding plate 156. The electrode wash air fitting is connected to the electrode wash air tube 130 (FIGS. 4, 6 and 7) which extends up to the front end of the spray gun 40.

Figure 11:
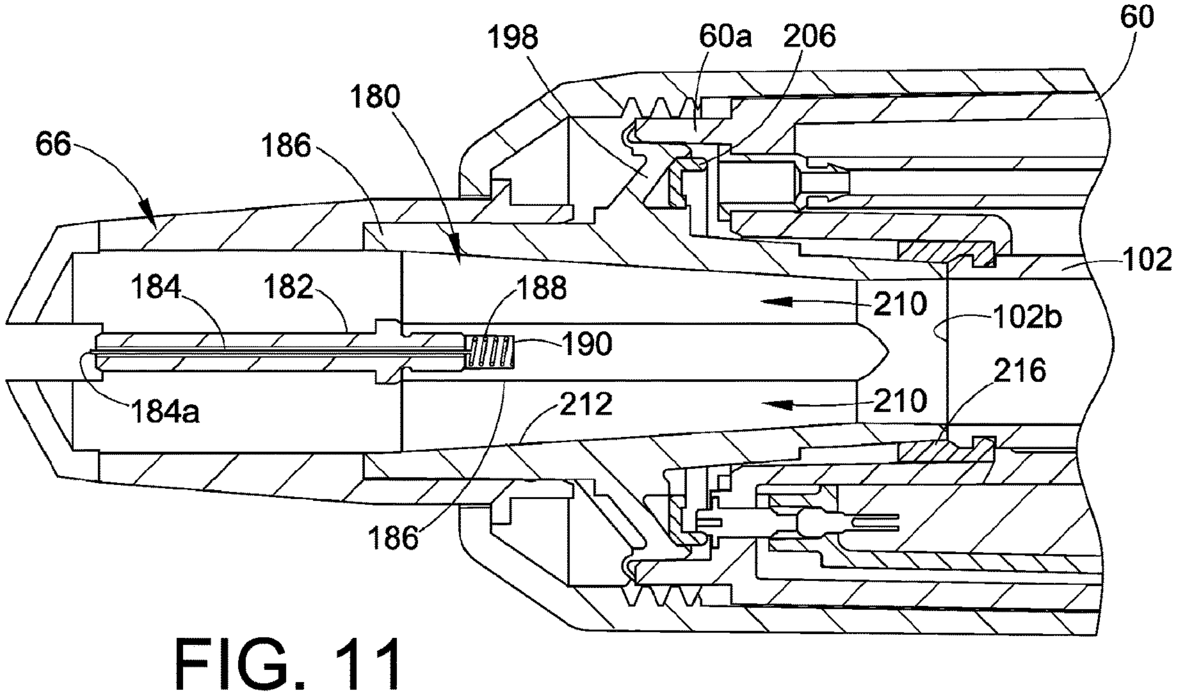
FIG. 11 is the view of FIG. 10 rotated 90 degrees about the longitudinal axis of the spray gun.

With reference to FIGS. 3, 10 and 11, we next will describe the forward section 26'. With the exception of the bulkhead component 96, the forward section 26' may be, but need not be, the same as the corresponding parts of the Encore® spray gun noted above. Therefore, a detailed description is not needed to understand and practice the inventions presented in this disclosure. We do not label FIGS. 10 and 11 as prior art because the forward section 26' is shown in combination with the rearward section 44 that receives dense phase powder. The forward section 26' may also be the same for the tube mount configuration or a bar mount configuration described hereinafter, or a different mounting configuration as needed. The use, however, of the same forward section 26' design can greatly reduce the parts inventory and assembly times for the various spray guns that can be configured in different ways, such as, for example, a spray gun that is supplied from a dilute phase powder pump (such as a Venturi pump), a dense phase powder pump, or spray guns that are used with the different mounting configurations or as a manual or automatic spray gun.

The forward section 26' includes an electrode support assembly 180. The electrode support assembly includes an electrode holder 182 that has an electrode 184 disposed within a passage **182*a* in the electrode holder 182. An electrode tip 184*a* extends outside the electrode holder 182. The electrode holder 182 has a first end that is received in a spider 186. The electrode 184 includes a coiled end 188 that extends into a blind bore 190 in the spider 186. Two angled ducts 192, 194 are provided in the spider 186 and that extend outward through a flange 198. In one of the angled ducts 192, a current limiting resistor 200 is disposed and has a first lead 202 that extends down to contact the electrode coiled end 188. A second lead 204 of the resistor 200 contacts a conductive ring 206 that is supported on a back side of the flange 198. The multiplier 32' is connected to an output contact pin 208 that contacts the conductive ring 206. In this manner, high voltage electrical energy from the multiplier 32' is electrically connected to the electrode 184. As best shown in FIG. 11, the spider 186 includes flow passages 210 that allow powder to flow past the spider 186 and into the spray nozzle 66**.

At this point, some of the differences between a dilute phase spray nozzle and a dense phase spray nozzle are useful to understand. In a spray gun for powder that is supplied from a Venturi or other dilute phase powder pump, for example the Encore® model spray guns discussed herein, the spray nozzle is designed to provide a desired spray pattern through a slot or other spray outlet in the spray nozzle. The powder flow into the spray nozzle tends to have a high velocity and a large volume of flow air, thus providing a low powder/flow air ratio or lean mix. The spray nozzle then does not have flow air or dilution air added because the powder flow is already dilute. The spray nozzle will tend to slow down the velocity of the powder flow as it exits the powder tube, and then form a desired spray pattern, often like a cloud of powder coating material. Typically then the electrode tip will be disposed within the spray nozzle. For a dense phase spray gun, the powder tube can provide the spray outlet because the dense phase powder flow may appear as a liquid or stream-like flow. In that case, the dense phase spray nozzle would include a source of pressurized air to shape the spray pattern just forward of the spray nozzle, with the electrode tip also disposed on the outside of the spray nozzle. In other cases, a dense phase spray nozzle may include a source of flow air in the nozzle to begin diluting the spray powder before it exits the spray nozzle. Accordingly, the dense phase spray nozzles can be more complex to make and represent additional inventory of parts for different spray guns. With the inventions herein, the simpler dilute phase spray nozzle may be used in a spray gun even though the spray gun is fed from a pump that produces a powder flow that has a higher density than would a dilute phase pump or a Venturi pump. The spray nozzle 20, 66 as noted in the exemplary embodiments herein of the hybrid spray gun 40, therefore, may be a dilute phase spray nozzle such as the Encore® related spray nozzle or other dilute phase spray nozzle. When the dilute phase forward section 26, 26' of a hybrid spray gun 40 is used, a substantial savings is realized in reduced inventory of special parts that are otherwise needed for a dense phase spray gun that uses a dense phase forward section. This also facilitates the use of a configurable spray gun as discussed herein.

The spider 186 may include a tapered channel 212 (which corresponds to the frusto-conical path portion 25' in FIG. 2) between the end of the front powder tube 102. This tapered channel 212 is frusto-conical in shape and is used in a dilute phase spray gun to allow the high flow powder stream to dissipate some energy before entering the spray nozzle 66 and also to further diffuse so that the powder can be electrostatically charged more efficiently. But the spider tapered channel 212 cannot be used in place of the expansion chamber 54 because the dense phase powder that would enter the spider 186, even if diffuser air were added, would travel too short a distance to diffuse into a dilute phase for spraying with a dilute phase nozzle.

The electrode wash air tube 130 is connected to an air wash fitting 214 that opens to the space behind the flange 198. This electrode wash air passes through the second angled duct 194 and into the blind bore 190. The electrode wash air then flows past the electrode 184 through the annular space between the electrode 184 and the inside diameter of the of the passage **182*a* in the electrode holder 182**.

The front powder tube 102 is positioned and held adjacent to the spider 186 by a retaining seal member 216. The spider 186 is captured between the spray nozzle 66 and the front end of the front gun body 60 when the nozzle nut 70 is tightened onto the front gun body 60. This also applies an axial load against the front powder tube 102 to help assure it is fully seated in the front portion of the bulkhead 96 as previously described above, and seats the spider 186 in the retaining seal 216.

Figure 12:
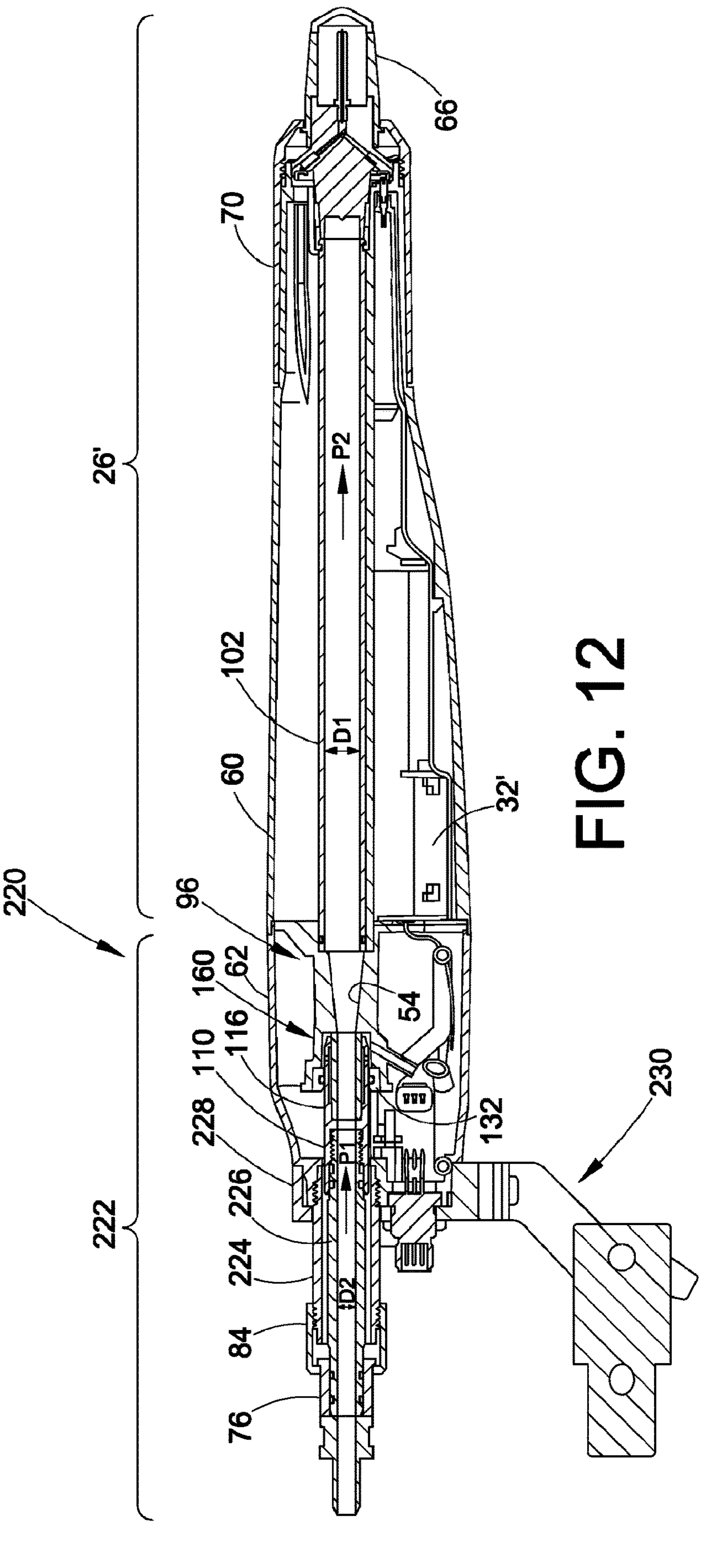
FIG. 12 is an embodiment of a hybrid spray gun in a bar mount configuration.

With reference to FIG. 12 we illustrate an embodiment of a hybrid spray gun 220 in a bar mount configuration. Many of the components for the bar mount configuration may be the same as used for the tube mount configuration and their description will not be repeated. Like reference numerals are used for like parts. The bar mount configuration does not use the extended length of the tube mount configuration described herein above. In an embodiment, the spray gun 40 includes a forward section 26' that may be but need not be the same as the forward section 26' of the tube mount configuration. Accordingly, the description of that portion of the spray gun 220 need not be repeated. The spray gun 220 has a rearward section 222 that also may have many of the same components as the above embodiment. But as noted, the rearward section 222 does not include the mount tube extension. But, the bulkhead 96 may be the same, as well as the diffuser carrier 110, the air diffuser 58, the rear gun body 62 and the seal carrier 132 may be the same. A clamp tube 224 is also used for the same purpose as in the tube mount configuration except that it can be shorter in length. A rear powder tube 226 connects with the diffuser carrier 110 in a similar manner, but also can be comparatively shorter in length. The clamp tube 224 cooperates with a retaining nut 84 and inlet hose connector 76.

The bar mount configuration includes a mount bracket 228 that supports a bar mount assembly 230. The bar mount configuration may also include an electrical input and a diffuser air inlet as in the tube mount configuration. Accordingly, the bar mount configuration and the tube mount configuration share many similar components with most of the internal components being the same. The rearward section 222 shares many common components, particularly those within the rear gun body 62. The primary differences between the tube mount and bar mount configurations are the bar mount assembly 230, the mount bracket 228 and the shorter powder tube 226 and clamp tube 224. The hose connector 76 may be connected to receive powder flow from a dense phase pump, yet the spray gun 220 will spray powder in dilute phase.

The rear powder tube 226 and the diffuser carrier 110 and the air diffuser 58 also form a subassembly 160 (FIG. 5) that can be easily withdrawn from the spray gun 220 without disassembly of the spray gun. The subassembly 160 can be removed by simply loosening the retaining nut 84 and pulling the subassembly out of the back end of the spray gun 220.

Figure 13:
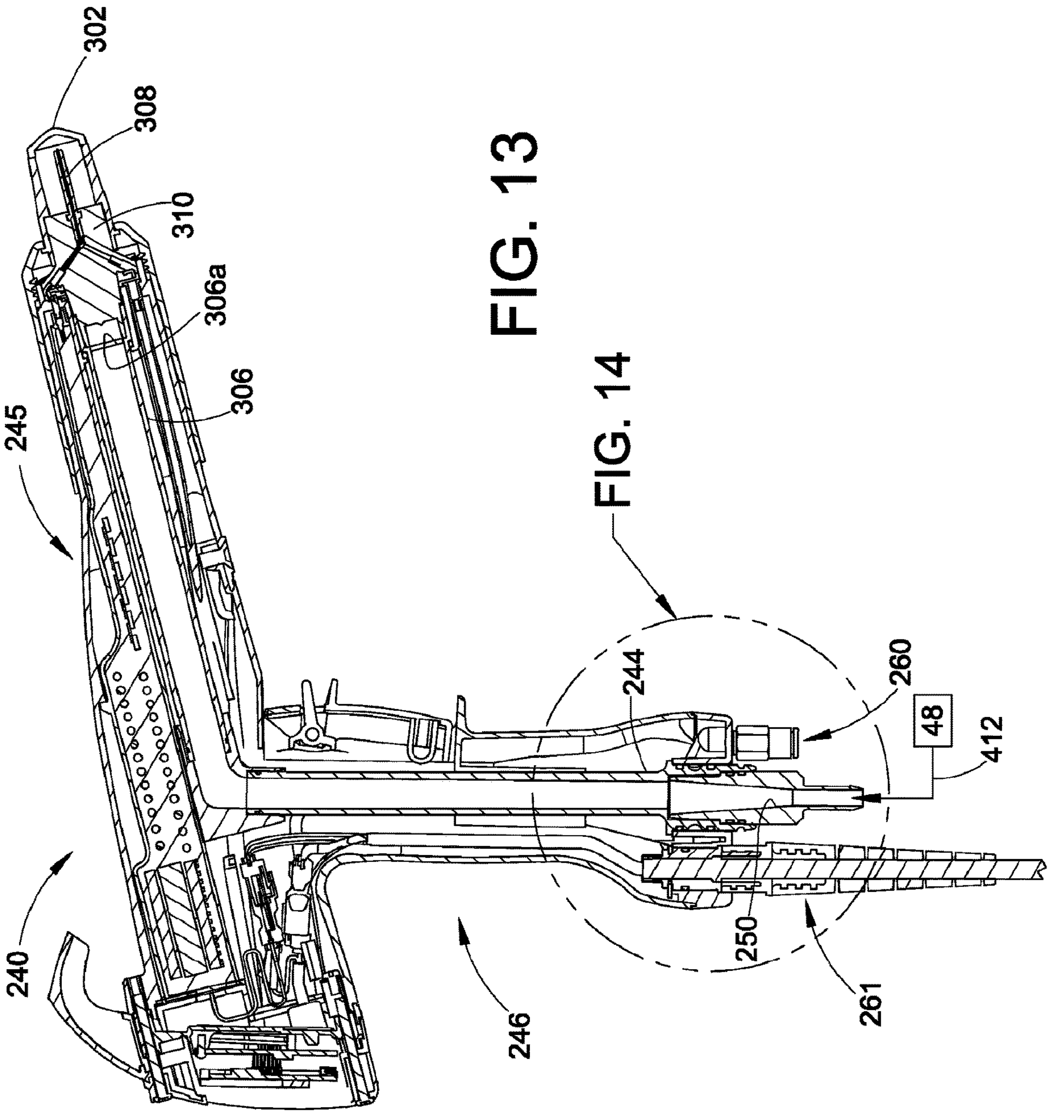
FIG. 13 is an embodiment of a manual hybrid spray gun in longitudinal cross-section.
Figure 14:
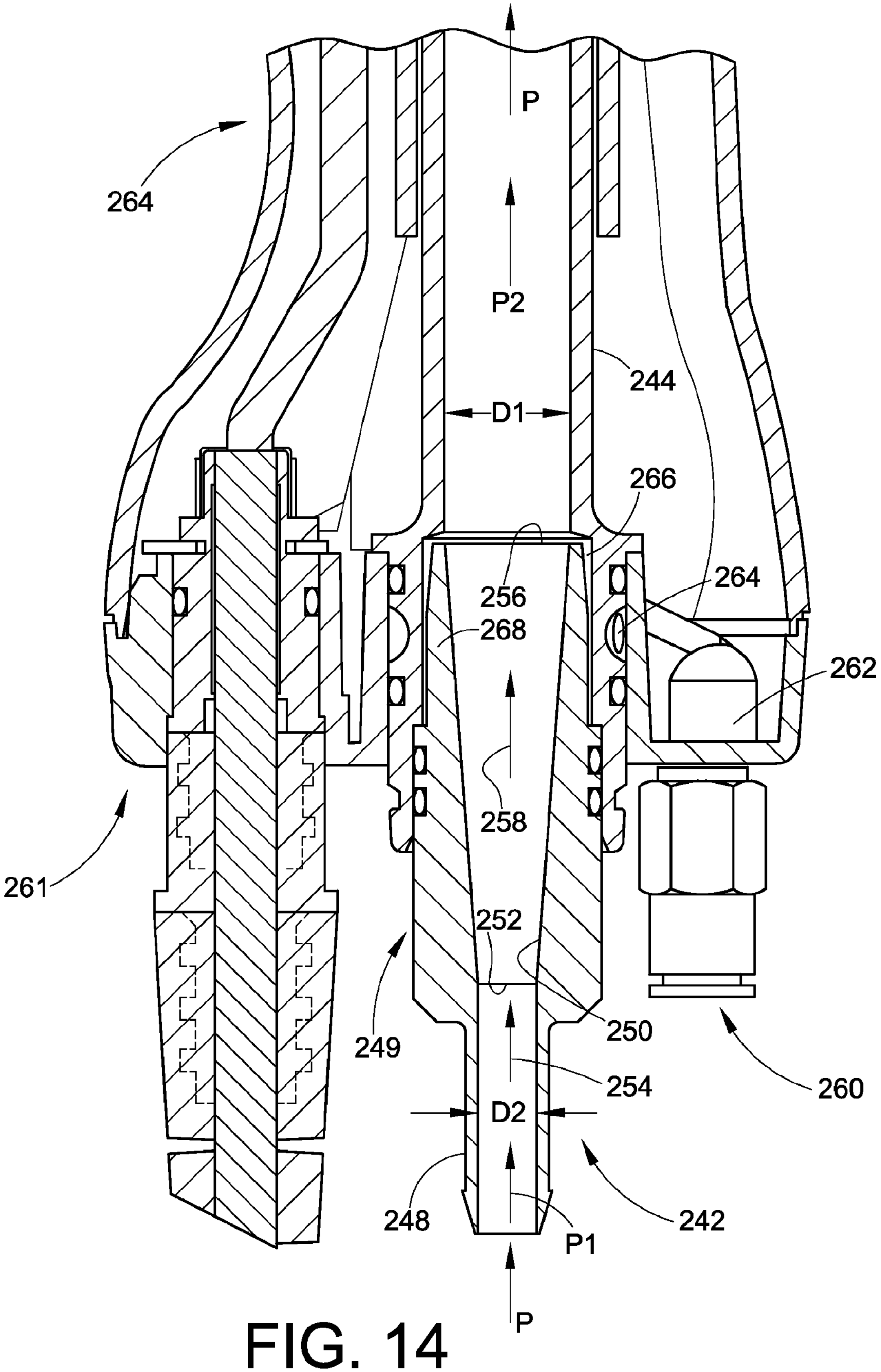
FIG. 14 is an enlarged view of the circled portion of FIG. 13.

With reference to FIGS. 13 and 14, the configurable gun concept herein may also be utilized with a manual spray gun. For example, an exemplary manual spray gun 240 is presented which may be although need not be substantially the same as an Encore® model manual spray gun available from Nordson Corporation, Westlake, Ohio. This spray gun is also fully described in United States Patent application publication no. 2009/0107397 published on Apr. 30, 2009, to Mather et al. for APPARATUS AND METHODS FOR PURGING MATERIAL APPLICATION DEVICE, the entire disclosure of which is fully incorporated herein by reference. This manual spray gun is designed to spray dilute phase powder. But in accordance with another concept of the present invention, a different hose connector is used so that the spray gun can be connected to and used with a powder flow from a dense phase powder pump 48 (FIG. 13).

In an embodiment, a hose connector 242 is received in the back end of a powder tube 244 that extends into a handle 246 and up to the main gun body or barrel 245. As best illustrated in FIG. 14, the hose connector 242 includes a hose connection barb 248 to which a powder feed hose 412 can be attached that supplies powder from the dense phase pump 48. The hose connector 242 also may include a transition section 249 having an expansion chamber 250 therein. The expansion chamber 250 has a first end 252 that has a diameter or cross-sectional area that preferably matches the diameter D2 or cross-sectional area of the flow path 254 through the hose barb 248. The expansion chamber 250 has a second end 256 with a diameter or cross-sectional area that preferably matches the diameter D1 or cross-sectional area of the powder tube 244. The dimensions D1 and D2 may be but need not be the same as D1 and D2 in the embodiment of FIG. 2. The expansion chamber 250 thus provides a transition portion 258 of a powder flow path P having a smaller diameter portion P1 and a larger diameter portion P2 in the powder tube 244. The smaller diameter portion P1 may be used when the spray gun is connected to a dense phase powder pump. The larger diameter portion P2 may be the same as normally used when the spray gun 240 is used to spray dilute phase powder.

As described in the referenced patent application publication, the spray gun 240 may include a purge air inlet 260 and an electrical connection 261. Purge air enters and passes into a passageway 262 that communicates through holes 264 with an annulus 266 that surrounds a forward portion 268 of the hose connector 242. The purge air passes up into the powder tube 244 to purge the spray gun 240. In accordance with the teachings herein, the purge air inlet 260 may be used to supply diffuser air into the powder flow path P2 during a non-purge operation, for example a coating operation. The diffuser air can be used to dilute the dense phase powder received from the dense phase powder pump 48, so that the spray gun 240 can still be used to spray the powder in a dilute phase. Note that in the manual version of FIG. 13 the diffuser air enters the powder flow path forward or downstream of the expansion chamber 250, whereas in the automatic spray gun configurations described herein above (the tube mount and bar mount configurations) the diffuser air enters the powder flow prior to entering the expansion chamber 54. The manual spray gun 240 may also include a spray orifice 302, spray nozzle 304, forward powder tube 306 (preferably but not necessarily having the same diameter D2 as the powder tube 244), and an electrode 308. The forward section of the gun body 245 may include a spider 310 and nozzle nut 312 which may be but need not be the same as the corresponding parts in the automatic gun embodiments hereinabove.

Note that in comparison with FIG. 2, the powder flow path inlet 16' is provided by the hose barb powder path 254, the powder flow path outlet 18' is provided by the outlet end **306*a* of the forward powder tube 306, the transition section 52 is provided by the transition section 249, and the member 58 for adding diffuser air is provided by the purge air flow path into the annulus 266**.

It should be further noted that the use of the purge air inlet 260 to provide diffuser air during a coating operation (which would occur with powder flowing through the spray gun 240) also allows the same air inlet 260 to be used for supplying purge air during a purging operation (when powder is not flowing through the spray gun 240). Purging may be done as part of a cleaning operation or color change operation as is known.

The manual spray gun 240 therefore may be configured as a dilute phase powder spray gun supplied by a dilute phase pump as conventionally designed and used. Alternatively, by changing one part, the inlet hose connector 242, the manual spray gun 240 is re-configured as a hybrid manual spray gun that can be supplied with dense phase powder from a dense phase pump 48 yet spray a dilute phase powder spray pattern. In this hybrid manual gun, the air inlet 260 can be used to supply dilution air during coating operations and purge air during cleaning and color change operations. Different air flow rates for purge and dilution may be used as needed.

Figure 15:
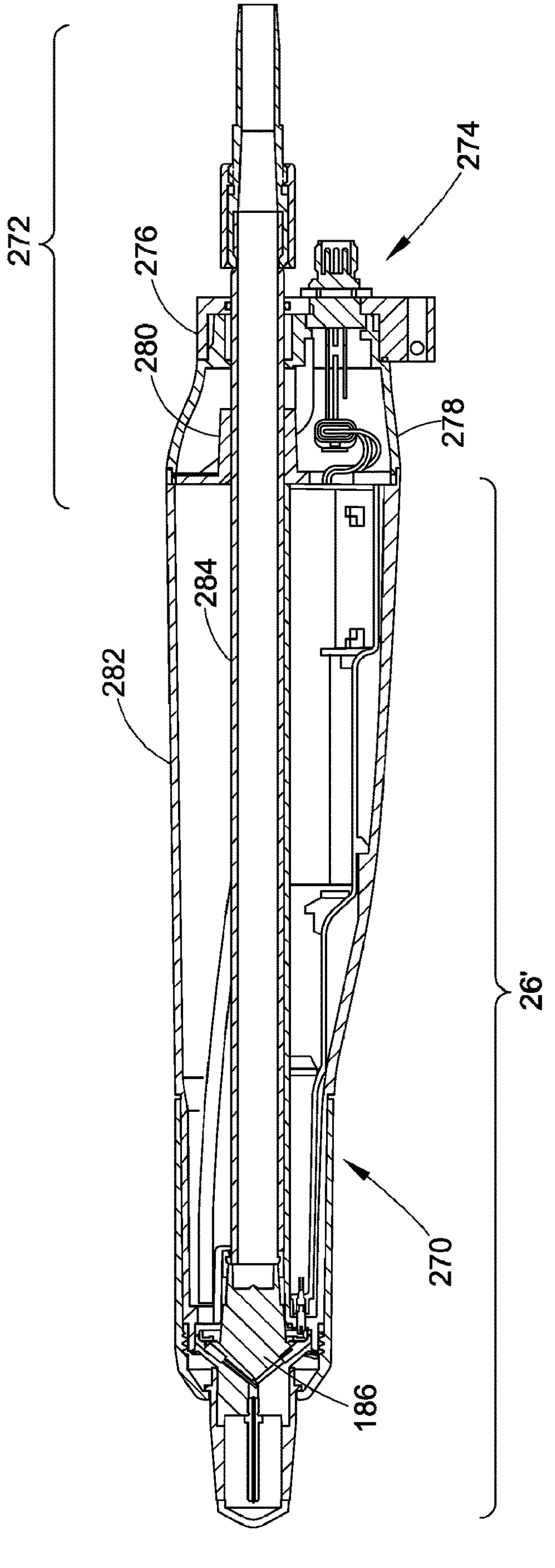
FIG. 15 is a prior art spray gun in longitudinal cross-section in a bar mount configuration.

With reference to FIG. 15, we illustrate a bar mount version of a dilute phase spray gun, for example, the Encore® model noted hereinbefore. The spray gun 270 may include a forward section 26' that comprises the same parts as the forward sections 26' in the embodiment of the hybrid spray gun 220 illustrated in FIG. 12. A rearward section 272 includes a bar mount assembly 274 that may be the same as with the hybrid spray gun 220, including a mount bracket 276. The rear gun body 278 may be connected to a bulkhead 280 that is also connected to the front gun body 282 in a manner similar to the above embodiments. A powder tube 284 may be a single piece powder tube that extends through the spray gun 270 housing and is received in the spider 186 (FIG. 10). Because the spray gun 270 is designed for dilute phase powder spray, the powder tube 284 may be of a larger diameter as is known. A comparison of FIG. 12 and FIG. 15 illustrates the configurable spray gun concept presented in this disclosure. Using the same forward section 26' allows for a significant savings and efficiency in providing two selectable spray gun configurations, namely a spray gun 270 that is designed to spray dilute phase powder received from a dilute phase powder pump, such as a Venturi pump. By selecting a few basic parts that are different, however, a hybrid spray gun 220 is provided that can spray dilute phase powder even though the powder source is a dense phase powder pump. In order to build the hybrid spray gun 220, the bulkhead 96 is used in place of the bulkhead 280, the single powder tube 284 is replaced with a front powder tube 102 and a rear powder tube 226, the rear gun body 62 is used in place of the rear gun body 278. The different rear gun body 62 results from the use of the different bulkhead 96 that is longer than the bulkhead 280 because of the inclusion of the expansion chamber 54. The rear gun body 62 also includes a threaded back end to mate with the clamp tube 224.

It should be noted at this time that the exemplary embodiments herein illustrate components that are of a selected shape and size as needed for particular spray gun designs. However, in terms of providing a basic spray gun design that can selectively be configured to operate with a dilute phase or dense phase spray gun, the choice of which parts may be the same and which parts are swapped is largely a matter of design choice based on the overall spray gun functionality desired. The basic teaching for the configurable spray gun concept presented herein is the transition section 52 (FIG. 2) having the expansion chamber 54 and the optional member or air diffuser 58, along with the accompanying use of a front powder tube and a rear powder tube having different diameters from each other, so that a first selectable spray gun configuration allows the spray gun to be used with a dilute phase powder pump (FIG. 15 for example) and a second selectable spray gun configuration allows the spray gun, which we call a hybrid spray gun herein, to be used with a dense phase powder pump (FIG. 12 for example) while spraying dilute phase powder.

Figure 16:
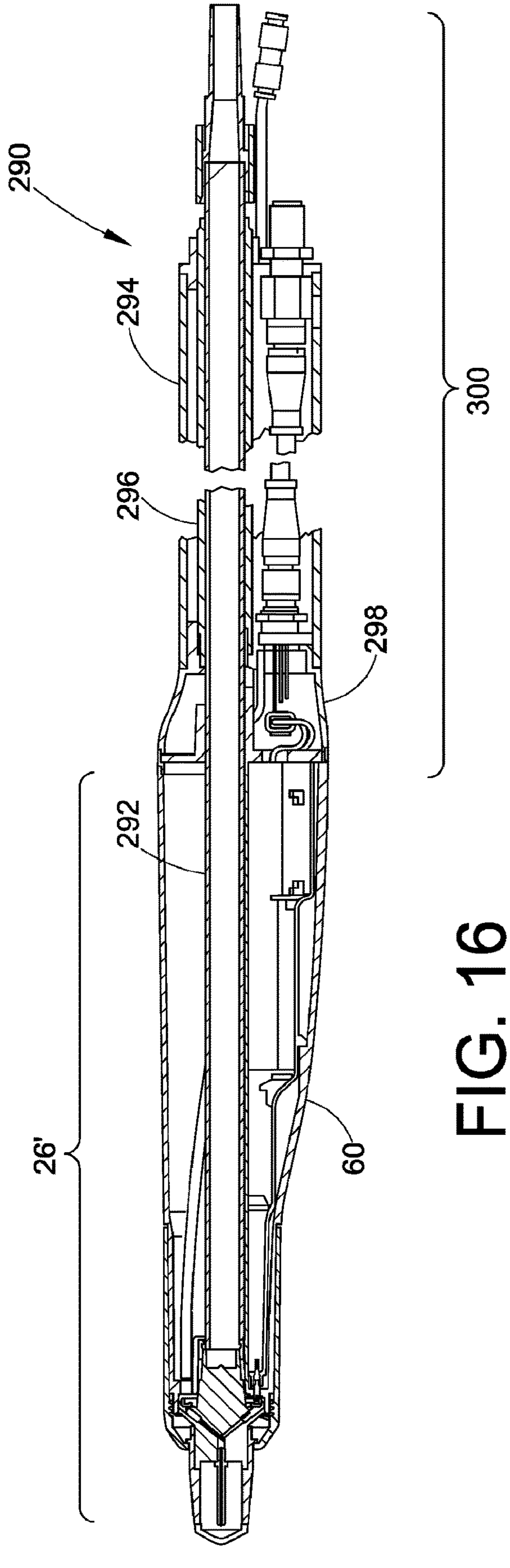
FIG. 16 is a prior art spray gun in longitudinal cross-section in a tube mount configuration.

A similar analysis can be applied for the tube mount configuration of FIG. 4. FIG. 16 illustrates a tube mount configuration for the traditional Encore® spray gun 290. This spray gun 290 uses a single piece powder tube 292, the common forward section 26', the mount tube 294 extension, the clamp bar 296 and a rear gun body 298 as part of the rearward section 300. A comparison with the hybrid spray gun 40 of FIG. 4 shows that for the hybrid configuration, a front powder tube 102 and back powder tube 78 are used with a different bulkhead 96 as compared with the traditional spray gun embodiment 290 which uses the single piece powder tube 292. Again, the rear gun bodies 298, 62 may be different because of the exemplary size and shape of the bulkhead 96 used in the hybrid spray gun, but such would not necessarily be required, just as with the bar mount configuration.

Figure 17:
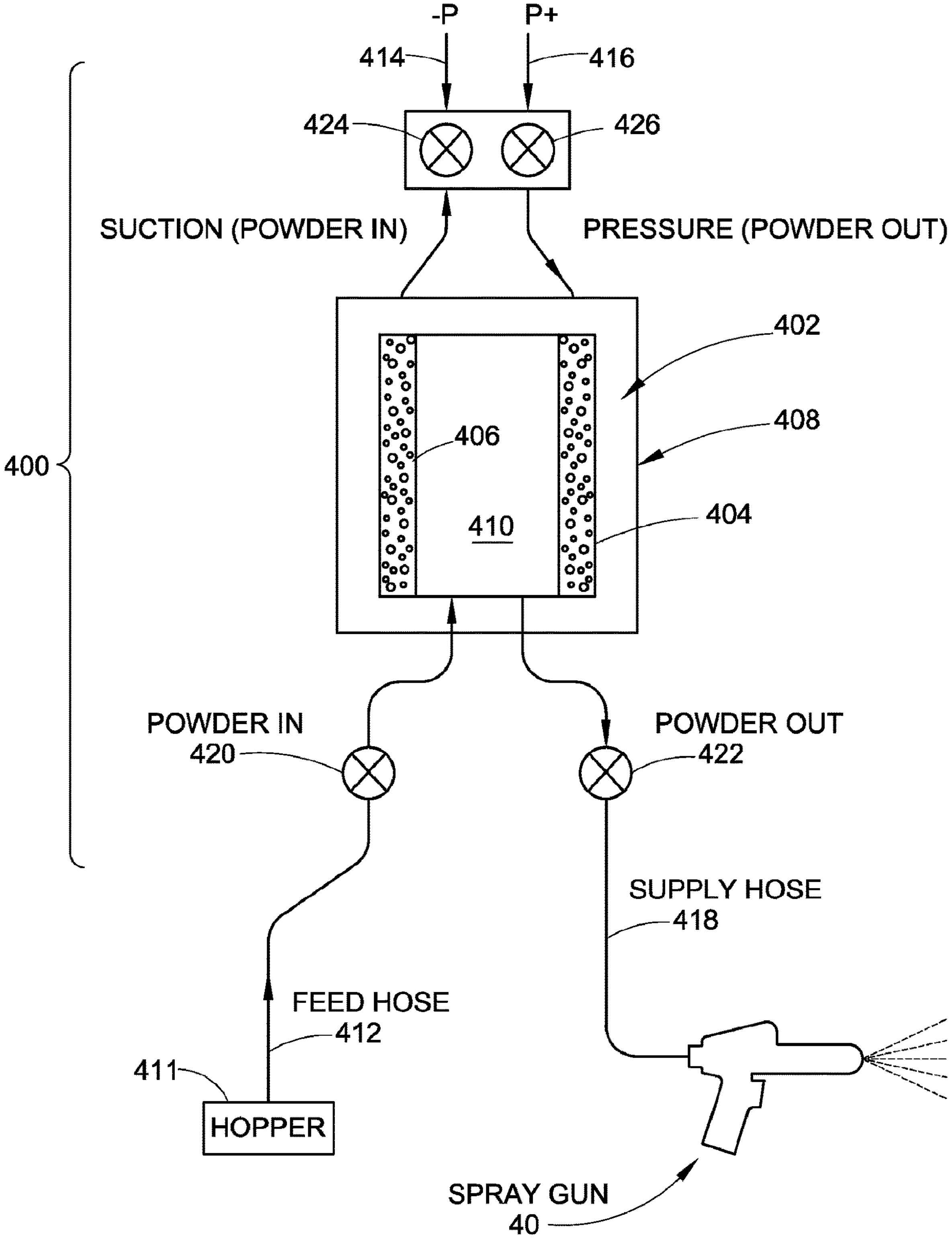
FIG. 17 is a schematic drawing of an exemplary dense phase pump that may be used with the present inventions.

We have referred to a dense phase powder pump 48 in the above disclosure, which are also commonly known as high density powder pumps. There are many different dense phase pumps available commercially, and one such pump is described in U.S. Pat. No. 7,997,878 issued on Aug. 16, 2011, to Terrence M. Fulkerson for DENSE PHASE POWDER PUMP WITH SINGLE ENDED FLOW AND PURGE; and U.S. Pat. No. 7,150,585 issued on Dec. 19, 2006, to Kleineidam et al. for PROCESS AND EQUIPMENT FOR THE CONVEYANCE OF POWDERED MATERIAL, the entire disclosures of which are fully incorporated herein by reference. With reference to FIG. 17, an exemplary dense phase pump 400 may use at least one or more pump chambers 402 in the form of a hollow cylinder 404 made of an air porous material 406. The material 406 for the pump chamber 402 may be but need not be similar to the air diffuser 58 described herein, for example sintered polyethylene. Each pump chamber 402 is disposed in a pressure chamber 408 such that powder is drawn into a pump chamber volume 410 from a powder supply 411 through a feed hose 412 when the pressure chamber 408 has negative pressure applied from a vacuum source 414, and powder is pushed out of the pump chamber 408 to a supply hose 418 when positive pressure is applied from a pressure source 416 to the pressure chamber volume 410. Control of powder into and out of the pump chambers may be accomplished with powder flow control valves, for example, pneumatic pinch valves 420 (powder in) and 422 (powder out) respectively, which open and close out of phase with respect to each other as is known. Pressure control valves, for example vacuum control valve 424 and positive pressure control valve 426 may also be used to control the timing of when negative and positive pressure cycles occur. The low flow air for dense phase powder flow arises from the use of pressure to move the powder, as opposed to high velocity air as used in a dilute phase powder pump such as a Venturi pump. Different dense phase powder pump designs may produce powder flows that vary in the powder/air ratio or in other words how rich the powder flow is into the spray gun, and similarly different Venturi pump designs may produce different levels of lean powder flows. For this reason we do not limit the disclosure herein to a definition of what is dense phase versus dilute phase. But a dense phase powder flow will typically be used with smaller diameter or cross-sectional powder flow paths as compared to a dilute phase powder flow path due to the lower flow air volume in the powder flow. The schematic of FIG. 17 shows an embodiment of the inventive concept of a hybrid spray gun 40 that uses a dense phase powder flow into the spray gun and sprays the powder from a dilute phase front end.

The inventions have been described with reference to the exemplary embodiments. Modifications and alterations will occur to others upon a reading and understanding of this specification and drawings. It is intended to include all such modifications and alterations insofar as they come within the scope of the appended claims or the equivalents thereof.

We claim:

1. A spray gun comprising:

a gun body comprising a spray outlet and a powder inlet; and a powder flow path comprising an inlet end and an outlet end, wherein powder coating material can flow from said powder inlet to said powder flow path inlet end and from said powder flow path outlet end to said spray outlet, wherein said powder flow path comprises a first portion with a first cross-sectional area, a second portion with a second cross-sectional area greater than the first cross-sectional area, and a transition portion having an expansion chamber that joins said first portion and said second portion, a first recess at a first end of the expansion chamber, and a second recess at a second end of the expansion chamber, and wherein the first portion includes a first tube received in the first recess and a diffuser, and the second portion includes a second tube received in the second recess.

2. The spray gun of claim 1, comprising an electrode connectable to a source of electrical energy, said electrode being adapted to apply an electrostatic charge to powder coating material during a coating operation.

3. The spray gun of claim 1, wherein said powder flow path inlet end comprises a powder tube that is adapted to receive powder coating material from a dense phase pump.

4. The spray gun of claim 3, wherein the powder tube is connected to an inlet end of the second tube.

5. The spray gun of claim 3, wherein the powder tube is recessed in the first tube.

6. The spray gun of claim 1, wherein said gun body comprises a handle that is manually held during a coating operation.

7. The spray gun of claim 1, wherein said expansion chamber comprises a frusto-conical wall.

8. The spray gun of claim 7, comprising a second frusto-conical wall portion of said powder flow path, said second frusto-conical wall portion being disposed between said expansion chamber and said spray outlet.

9. The spray gun of claim 1, further comprising a bulkhead including the transition portion, the bulkhead securing the transition portion to the gun body.

10. The spray gun of claim 1, wherein the first second tube includes a diffuser carrier that receives the diffuser.

11. The spray gun of claim 1, wherein the second cross-sectional area is downstream of the first cross-sectional area.

12. The spray gun of claim 1, further comprising a seal and/or a gasket in the first recess.

13. The spray gun of claim 12, comprising the seal and a seal carrier in the first recess retaining the seal.

14. The spray gun of claim 12, comprising the gasket in the first recess.

* * * * *